(12) United States Patent
Shirakami et al.

(10) Patent No.: US 8,829,080 B2
(45) Date of Patent: Sep. 9, 2014

(54) COATING AGENT AND METHOD FOR PRODUCTION THEREOF

(75) Inventors: Jun Shirakami, Osaka (JP); Sadamu Nagahama, Osaka (JP)

(73) Assignee: DIC Corporation, Tokyo (JP)

( * ) Notice: Subject to any disclaimer, the term of this patent is extended or adjusted under 35 U.S.C. 154(b) by 329 days.

(21) Appl. No.: 12/745,125

(22) PCT Filed: Feb. 25, 2009

(86) PCT No.: PCT/JP2009/053322
§ 371 (c)(1),
(2), (4) Date: May 27, 2010

(87) PCT Pub. No.: WO2009/144980
PCT Pub. Date: Dec. 3, 2009

(65) Prior Publication Data
US 2010/0273930 A1 Oct. 28, 2010

(30) Foreign Application Priority Data
May 26, 2008 (JP) .................................. 2008-136528

(51) Int. Cl.
| | | |
|---|---|---|
| C08L 83/00 | (2006.01) | |
| C08G 18/42 | (2006.01) | |
| C09D 151/08 | (2006.01) | |
| C08G 18/12 | (2006.01) | |
| C08F 271/00 | (2006.01) | |
| C09D 151/00 | (2006.01) | |
| C08G 18/66 | (2006.01) | |
| C08G 18/08 | (2006.01) | |
| C09D 175/04 | (2006.01) | |

(52) U.S. Cl.
CPC ............ *C08G 18/12* (2013.01); *C08G 2150/90* (2013.01); *C08G 18/423* (2013.01); *C09D 151/08* (2013.01); *C08F 271/00* (2013.01); *C09D 151/003* (2013.01); *C08G 18/6692* (2013.01); *C08G 18/0823* (2013.01); *C09D 175/04* (2013.01)
USPC .......................................... 523/201; 524/507

(58) Field of Classification Search
USPC .......................................... 523/201; 524/507
See application file for complete search history.

(56) References Cited

U.S. PATENT DOCUMENTS

| 5,866,258 | A | * | 2/1999 | Lucas ........................ 428/424.2 |
| 5,916,965 | A | | 6/1999 | Matsumoto et al. |
| 2004/0028823 | A1 | * | 2/2004 | Dutt ........................... 427/385.5 |
| 2007/0015852 | A1 | * | 1/2007 | Akutagawa et al. .......... 523/201 |
| 2007/0117902 | A1 | | 5/2007 | Origuchi et al. |
| 2009/0069497 | A1 | * | 3/2009 | Roesler et al. ................ 524/588 |

FOREIGN PATENT DOCUMENTS

| JP | 09-157342 A | 6/1997 |
| JP | 09-183944 A | 7/1997 |
| JP | 09-235332 A | 9/1997 |
| JP | 2000-351805 A | 12/2000 |
| JP | 2003-064294 A | 3/2003 |
| JP | 2003-147150 A | 5/2003 |
| JP | 2003-165915 A | 6/2003 |
| JP | 2006-291089 A | 10/2006 |
| JP | 2008-063404 A | 3/2008 |
| JP | 2009-067891 A | 4/2009 |
| WO | 2005-054341 A | 6/2005 |

OTHER PUBLICATIONS

"Silicones." Premier Silanes Company. pp. 1-2, 2007.*
"Bayhydrol." Bayer Materia Sciencel, pp. 1-2, Oct. 6, 2010.*
International Search Report of PCT/JP2009/053322, Mailing Date of May 19, 2009.
Supplementary European Search Report dated Oct. 8, 2010, issued in corresponding European Patent Application No. 09754488.6.

* cited by examiner

*Primary Examiner* — Hannah Pak
(74) *Attorney, Agent, or Firm* — Westerman, Hattori, Daniels & Adrian, LLP

(57) ABSTRACT

Disclosed is a coating agent characterized by comprising: a core-shell-type resin particles (A) each having a shell layer and a core layer; a compound (B) having at least one selected from the group consisting of a hydrolysable silyl group and a silanol group and also having an epoxy group; and an aqueous medium, wherein the shell layer comprises (a1) a urethane resin with 2000 to 5500 mmol/kg of an aliphatic cyclic structure and at least one selected from the group consisting of a carboxyl group and a carboxylate group and the core layer comprises (a2) a vinyl polymer having a basic nitrogen-atom-containing group. Further disclosed are a coating agent for a plastic base material and a coating agent for a metallic base material.

16 Claims, No Drawings

US 8,829,080 B2

COATING AGENT AND METHOD FOR PRODUCTION THEREOF

TECHNICAL FIELD

The present invention relates to a coating agent which can be used for coating a base material surface formed from, for example, plastic or metal.

BACKGROUND ART

It is required that coating agents be capable of imparting design freedom to the surface of various base materials as well as forming a film having a property of preventing deterioration of the base material surface. Particularly, in recent years, a coating agent capable of forming a film having water resistance or solvent resistance and excellent chemical resistance to a level of possibly preventing deterioration of the base material due to attachment of chemicals in, for example, cleaner or acidic rain, is demanded from the industrial field.

A coating agent having the above-described properties is frequently demanded for the purpose of surface protection of plastic products which are prone to deteriorate particularly due to the attachment of organic solvents or chemicals.

However, while there are a wide variety of materials constituting the plastic products such as acrylonitrile-butadiene-styrene resins (ABS resins), polycarbonate resins (PC resins), polystyrene resins (PS resins) and polymethyl methacrylate resins (PMMA resins), a coating agent having excellent adhesiveness even to base materials which are generally called sparingly adhesive base materials, such as ABS resins, and being capable of forming a film having excellent water resistance, solvent resistance or chemical resistance, is not yet known.

Since many of the plastic base materials generally undergo plasticization by heat, in order to form a coating film by applying various coating agents on the surface of the plastic base material, the drying temperature generally needs to be set at 60° C. or below.

However, under such low temperature conditions as described above, usually, the crosslinked structure between the binder resins constituting the coating film is not formed sufficiently, and as a result, a coating film having a high level of solvent resistance or water resistance may not be formed in some cases.

On the other hand, concomitantly with the recent increase in the demand for metals, the demand for a coating agent for surface protection of metallic base materials including steel sheets is also increasing. Such a coating agent is required to have, in addition to the solvent resistance as mentioned above, corrosion resistance to a level capable of preventing peeling or swelling of coating film due to the corrosion of metallic base materials, or a high level of chemical resistance. In particular, in the steel industry where cleaning of the coating film surface formed on the surface of a metallic base material using an alkaline cleaner or the like is frequently implemented, chemical resistance is an important property for preventing peeling or dissolution of coating film under the effect of the cleaner, deterioration of the metallic base material and the like.

As a method of forming a coating film with excellent chemical resistance, there is known a method of rapidly forming a crosslinked structure between binder resins by performing the drying process at a high temperature of about 200 to 250° C.

However, in the steel industry in recent years, there is a tendency of setting the drying temperature generally at a low temperature of about 80° C. and setting the drying time very short in the process of forming a coating film by applying a coating agent on the surface of a metallic base material and drying, in order to enhance the production efficiency for the metallic material. Under such conditions, it is difficult to obtain a coating film having excellent chemical resistance.

Coating agents capable of forming a coating film having the above-mentioned various properties have been examined for long, and for example, there is known an aqueous dispersion of a curable polymer containing polymer particles, a polyfunctional epoxy compound and a water-based medium, wherein the polymer particles are composed of at least two kinds of layers, in which phase A is composed of a carboxyl group-containing polymer, and phase B is an ethylenic polymer having a basic nitrogen atom-containing group (see, for example, Patent Citation 1).

However, in the aqueous dispersion of a curable polymer, it was often difficult to form a coating film having good adhesiveness to various plastic base materials such as those described above. Furthermore, the water resistance and solvent resistance of the coating film formed using the dispersion also do not satisfy the high level required in practice, and particularly, it is often difficult to form a coating film having excellent chemical resistance or corrosion resistance that are required of surface coating agent for metallic base materials.

As another coating agent, there is known an aqueous coating agent containing a vinyl-urethane-based copolymer in which the chain part of a vinyl-based polymer and the chain part of a urethane-based polymer are linked via a linking unit having bonds between silicon atoms and oxygen atoms (see, for example, Patent Citation 2).

However, since this aqueous coating agent has a relatively high crosslinking density inside the particles formed from the vinyl-urethane-based copolymer, it is difficult for fusion between the particles to occur during film formation, and as a result, it is not feasible in some cases to form a coating film having excellent solvent resistance, which is formed uniformly and densely.

Moreover, the aqueous coating agent is still unsatisfactory in terms of the adhesiveness to the plastic base materials, and in the coating film formed by using the aqueous coating agent, peeling or dissolution occurs due to the attachment of water or chemicals. Consequently, corrosion or deterioration of the base material may not be sufficiently prevented.

[Patent Citation 1] Specification of Japanese Patent Application Laid-Open Publication No. 9-235332

[Patent Citation 2] Pamphlet of International PCT Application No. 2005/054341

DISCLOSURE OF INVENTION

A technical problem to be solved by the present invention relates to a coating agent capable of forming a coating film having excellent solvent resistance, water resistance and chemical resistance, even when the temperature for coating film drying is a temperature lower than the conventional temperature.

Another technical problem to be solved by the present invention relates to a coating agent for plastics, which, when applied to plastic base materials, has excellent adhesiveness to various plastic base materials that are generally known and is capable of forming a coating film having excellent solvent resistance and water resistance or chemical resistance.

Another technical problem to be solved by the present invention relates to a coating agent for metals, which, when applied to metallic base materials, can prevent swelling or peeling of a coating film caused by the rust that can be generated on metallic base materials and is capable of forming a coating film having an excellent level of corrosion resistance, and excellent solvent, water resistance and chemical resistance.

The present inventors thought that in order to form a coating film excellent in solvent resistance, water resistance and chemical resistance, it might be important to enhance the crosslinking density of a coating film that is formed, and conducted an investigation.

Specifically, the inventors made an investigation on a coating agent containing a urethane resin having a crosslinkable functional group such as a carboxyl group, a vinyl polymer having a crosslinkable functional group such as a glycidyl group, and a water-based medium. With such a coating agent, it was possible to form a coating film with good water resistance, but the coating film was still practically insufficient in terms of solvent resistance and chemical resistance.

Furthermore, the coating agent could not form a uniformly and densely prepared coating film, and as a result, it is also difficult to form a coating film having excellent solvent resistance or corrosion resistance.

Therefore, the present inventors thought that in order to solve the technical problems of the present invention, the type of the crosslinkable functional group, as well as the structure of the resins constituting the coating agent and the positional relationship of the crosslinkable functional groups in the resin are important, and examined various combinations of resins and functional groups. Specifically, an investigation was made on a coating agent containing core-shell type resin particles which use a urethane resin having an aliphatic cyclic structure and one or more member selected from the group consisting of a carboxyl group and a carboxylate group, in the shell layer, and use a vinyl polymer in the core layer. As a result, a coating agent containing core-shell type resin particles which use in combination a urethane resin whose aliphatic cyclic structure has 2000 to 5500 mmol/kg, and uses a vinyl polymer having a basic nitrogen atom-containing group as the core layer, could form a coating film having significantly improved chemical resistance, but still the desired effects could not be obtained in terms of solvent resistance.

Thus, the present inventors made an investigation on a crosslinking agent capable of reacting with the core-shell type resin particles upon coating film formation.

Specifically, a coating agent containing the core-shell type resin particles and a melamine-based crosslinking agent which is well known as a crosslinking agent in combination, was examined. As a result, this coating agent could form a coating film which is well balanced between excellent chemical resistance, solvent resistance, water resistance and the like, by drying at a relatively high temperature of about 150° C. However, when the base material was a base material which is relatively weak against heat, such as plastic, deformation or discoloration of the base material frequently occurred.

Thus, in order to prevent thermal deformation of the base material or the like, the coating agent was applied on the surface of the base material and was dried at a low temperature of about 80° C. or lower. However, at this temperature, a coating film having practically sufficient level of solvent resistance or the like could not be formed in some cases.

The present inventors further proceeded with the investigation of the crosslinking agent, and examined an epoxy group as the crosslinking agent and a compound having at least one selected from the group consisting of a hydrolyzable silyl group and a silanol group. However, even when a coating agent obtained by combining the compound with a conventionally known general vinyl-based resin or the like, was used, a coating agent capable of forming a coating film having a very high level of solvent resistance or the like which is an object of the present invention, could not be obtained.

However, the inventors found that if a coating agent containing in combination the core-shell type resin particles, a crosslinking agent composed of a compound having an epoxy group and at least one selected from the group consisting of a hydrolyzable silyl group and a silanol group, and a water-based medium is used, even if the coating film drying temperature is a temperature lower than conventionally used temperatures, a coating film having excellent water resistance, chemical resistance and solvent resistance as compared with the case of using other crosslinking agents can be formed, and that a coating film capable of imparting excellent adhesiveness to base material with respect to plastic base materials, and excellent corrosion resistance that can prevent corrosion with respect to metallic base materials can be formed.

That is, the present invention relates to a coating agent containing core-shell type resin particles (A) having a shell layer composed of (a1) a urethane resin having an aliphatic cyclic structure with 2000 to 5500 mmol/kg and at least one selected from the group consisting of a carboxyl group and a carboxylate group, and a core layer composed of a vinyl polymer (a2) having a basic nitrogen atom-containing group, a compound (B) having an epoxy group and at least one selected from the group consisting of a hydrolyzable silyl group and a silanol group, and a water-based medium; and a coating agent for plastic base material, and a coating agent for metallic base material.

The coating agent of the present invention can form a crosslinked coating film even under a relatively low temperature environment, and can form a coating film having very excellent solvent resistance, water resistance or chemical resistance and corrosion resistance. Thus, the coating agent can be used as a surface protecting coating agent for plastic base materials, or as a surface protecting coating agent for metallic base materials such as steel sheets. Specifically, since the coating agent of the present invention can be suitably used for plastic base materials such as, ABS resins, PC resins, ABS/PC resins, PS resins and PMMA resins, the coating agent can be used in a wide variety of applications such as mobile telephones, electric appliances, instruments for office use, and interior decorating materials for automobiles.

Furthermore, the coating agent of the present invention can form a coating film having excellent corrosion resistance, which can prevent the generation of rust in metallic base materials such as plated steel sheets such as zinc-plated steel sheets and aluminum-zinc alloy steel sheets, or aluminum sheets, aluminum alloy sheets, electromagnetic steel sheets, copper sheets and stainless steel sheets. Thus, the coating agent can be used in the surface coating of, for example, construction members such as outside walls and roofs, civil construction members such as guard rails, soundproof walls and drainage ditches, electric appliances, industrial machines, and automobile parts.

BEST MODE FOR CARRYING OUT THE INVENTION

The present invention is a coating agent containing core-shell type resin particles (A) having a shell layer composed of (a1) a urethane resin having an aliphatic cyclic structure with 2000 to 5500 mmol/kg and at least one selected from the group consisting of a carboxyl group and a carboxylate group, and a core layer composed of a vinyl polymer (a2) having a basic nitrogen atom-containing group, a compound (B) having an epoxy group and at least one selected from the group consisting of a hydrolyzable silyl group and a silanol group, and a water-based medium, and in addition to these, as necessary, various additives, wherein the core-shell type resin particles (A) are dispersed in the water-based medium.

First, the core-shell type resin particles (A) will be explained.

The core-shell type resin particles (A) are resin particles having a bilayer structure of a shell layer and a core layer. In regards to the state of being dispersed in the water-based medium, it is preferable that substantially no crosslinked structure is formed inside the resin particles (A).

Here, the phrase "a crosslinked structure is substantially not formed" means that a crosslinked structure is not formed inside the resin particles (A), more specifically between the urethane resins (a1) constituting the shell layer, between the vinyl polymer (a2) constituting the core layer, or between the urethane resin (a1) and the vinyl polymer (a2), or means a state in which a minute crosslinked structure is formed to an extent of not impairing the effects of the coating agent of the present invention. It is preferable that the crosslinking density of the interior of such resin particles (A) is as low as possible for enhancing the film formability of the coating agent of the present invention and forming a coating film having excellent water resistance, chemical resistance or corrosion resistance, and it is more preferable that there is no crosslinked structure formed therein.

The degree of crosslinking inside the core-shell type resin particles (A) can be evaluated by examining the susceptibility of the resin particles (A) to the dissolution in an organic solvent. Specifically, as will be described in the following Examples, the degree of crosslinking can be evaluated based on the light transmittance (transparency) of a mixed liquid of an aqueous dispersion of the core-shell type resin particles (A) and tetrahydrofuran. When the mixed liquid having a concentration of the resin particles (A) of 4 mass % has a light transmittance (wavelength 640 nm) of 70% or greater, there is no crosslinked structure formed inside the resin particles (A), or if ever present, the extent of the crosslinked structure formed therein is very small, and it can be said that substantially no crosslinked structure is formed.

Here, the light transmittance may not become 100% in some cases, even when a crosslinked structure is not at all formed inside the core-shell type resin particles (A). This is thought to be attributable to the entanglement of the molecular chains. Therefore, there are instances where even if the light transmittance is less than 100%, there is no crosslinked structure formed inside the particles.

The term core-shell type as used in the present invention refers to a constitution in which a vinyl polymer (a2) constituting a core layer is present within urethane resin (a1) particles constituting a shell layer. At this time, the vinyl polymer (a2) may be dispersed inside the urethane resin (a1) particles in the form of multiple particles, or the vinyl polymer (a2) may form a core layer in a concentric form with the urethane resin (a1).

The core-shell type resin particles (A) preferably have an average particle size in the range of 5 to 100 nm, in order to enhance the solvent resistance, water resistance, chemical resistance or corrosion resistance of the coating film. The term average particle size as used herein means, as will be mentioned in the following Examples, the average particle diameter based on the volume measured by a dynamic light scattering method.

As for the core-shell type resin particles (A), it is preferable to use particles containing the urethane resin (a1) and the vinyl polymer (a2) at a mass ratio [(a1)/(a2)] of 10/90 to 70/30, and it is particularly preferable to use particles having a mass ratio of 20/80 to 55/45, in order to obtain a coating agent capable of forming a coating film which has excellent film formability, excellent solvent resistance, water resistance or chemical resistance, and excellent corrosion resistance for metallic base materials.

The core-shell type resin particles (A) have at least one of a carboxyl group and a carboxylate group as a hydrophilic group needed for dispersing in the water-based medium. The carboxyl group may be in the form of a carboxylate group, by being partially or completely neutralized by a basic compound or the like.

It is preferable that the at least one of a carboxyl group and a carboxylate group is present in the urethane resin (a1) constituting the shell layer, which is the outermost layer of the resin particles (A).

Next, the urethane resin (a1) which forms the shell layer of the core-shell type resin particles (A) will be explained.

The urethane resin (a1) forming the shell layer of the core-shell type resin particles (A) is a urethane resin that can be obtained by reacting a polyol and a polyisocyanate, and has at least one of a carboxyl group and a carboxylate group that contribute to hydrophilicity and the aliphatic cyclic structure with a specific mass.

It is important that the urethane resin (a1) has an aliphatic cyclic structure with 2000 to 5500 mmol/kg relative to the total amount of the urethane resin (a1), and it is particularly preferable that the urethane resin has an aliphatic cyclic structure with 3000 to 5000 mmol/kg. By using a urethane resin (a1) having an aliphatic cyclic structure with the above-mentioned specific mass, the corrosion resistance, water resistance or chemical resistance of the obtainable coating film, and the adhesiveness to various plastic base materials can be enhanced to a large extent. Particularly, by suppressing alkali hydrolysis of the urethane resin (a1), the chemical resistance of the formed coating film can be markedly enhanced.

Meanwhile, there are instances where a coating film having chemical resistance, adhesiveness to various plastic base materials, or an excellent level of corrosion resistance capable of preventing corrosion of metallic base materials, cannot be formed using a coating agent using a urethane resin having an aliphatic cyclic structure with 1500 mmol/kg instead of the urethane resin (a1) mentioned above. Also, there are instances where a coating film having excellent chemical resistance or the like cannot be formed using a coating agent containing a urethane resin having an aliphatic cyclic structure which exceeds 5500 mmol/kg. Specifically, a coating agent containing a urethane resin having an aliphatic cyclic structure with about 6000 mmol/kg, the film formability causes a decrease due to the rigid skeleton of the urethane resin, and as a result, there are instances where a coating film having chemical resistance, adhesiveness to various plastic base materials, and excellent level of corrosion resistance capable of preventing the corrosion of metallic base materials, may not be formed. Furthermore, a urethane resin having an aliphatic cyclic structure with about 6000 mmol/kg causes problems such as that gelation is prone to occur during the production.

As such, in order to provide the effects of the present invention, it is essential to introduce an aliphatic cyclic structure having a specific mass to the urethane resin (a1).

Examples of the structure include a cyclobutyl group, a cyclopentyl group, a cyclohexyl group, a cycloheptyl group, a cyclooctyl group, a propylcyclohexyl group, a tricyclo[5,2,1,0,2,6]decyl group, a bicyclo[4,3,0]nonyl group, a tricyclo[5,3,1,1]dodecyl group, a propyltricyclo[5,3,1,1]dodecyl group, a norbornene group, an isobornyl group, a dicyclopentanyl group, an adamantyl group, and the like, but among them, a cyclohexyl group, a norbornene group, an isobornyl group, and an adamantyl group are more preferred in terms of obtaining a coating film having excellent water resistance, chemical resistance or corrosion resistance.

The aliphatic cyclic structure such as described above can be introduced into the urethane resin (a1) by using an aliphatic cyclic structure-containing polyol or an aliphatic cyclic structure-containing polyisocyanate as the polyol or polyisocyanate used for the production of the urethane resin (a1).

As the urethane resin (a1), a resin having one or more selected from the group consisting of a carboxyl group and a carboxylate group as a hydrophilic group is used, in order to impart good water-dispersion stability to the core-shell type resin particles (A).

The carboxyl group and the carboxylate group-derived acid value possessed by the urethane resin (a1) is preferably in the range of 10 to 50, and more preferably in the range of 15 to 35. A urethane resin (a1) having an acid value in such a range can increase the water-dispersion stability of the core-shell type resin particles (A), and also increases the reactivity with the compound (B) that will be described later, so that a good balance can be obtained between the solvent resistance, water resistance and chemical resistance (particularly, alkali resistance) of the obtainable coating film.

The urethane resin (a1) may have at least one selected from the group consisting of a hydrolyzable silyl group and a silanol group.

The hydrolyzable silyl group is a functional group in which a hydrolyzable group is directly bound to a silicon atom, and for example, a functional group represented by the following general formula may be mentioned. The hydrolyzable silyl group is converted to a silanol group that will be shown below, through hydrolysis.

[Chem. 1]

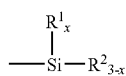

(I)

(wherein $R^1$ is a monovalent organic group such as an alkyl group, an aryl group or an aralkyl group; $R^2$ is a halogen atom, an alkoxy group, an acyloxy group, a phenoxy group, an aryloxy group, a mercapto group, an amino group, an amide group, an aminooxy group, an iminooxy group or an alkenyloxy group; and x is an integer from 0 to 2).

Examples of the alkyl group include a methyl group, an ethyl group, a propyl group, an isopropyl group, a butyl group, an isobutyl group, a pentyl group, a neopentyl group, a 1-methylbutyl group, a 2-methylbutyl group, a hexyl group, and an isohexyl group.

Examples of the aryl group include a phenyl group, a naphthyl group, and a 2-methylphenyl group, and examples of the aralkyl group include a benzyl group, a diphenylmethyl group, and a naphthylmethyl group.

Examples of the halogen atom include a fluorine atom, a chlorine atom, a bromine atom, and an iodine atom.

Examples of the alkoxy group include a methoxy group, an ethoxy group, a propoxy group, an isopropoxy group, and a butoxy group.

Examples of the acyloxy group include acetoxy, propanoyloxy, butanoyloxy, phenylacetoxy, and acetoacetoxy, and examples of the aryloxy group include phenyloxy, and naphthyloxy. Examples of the alkenyloxy group include an aryloxy group, a 1-propenyloxy group, and an isopropenyloxy group.

The foregoing $R^2$ is preferably an alkoxy group, and particularly preferably an ethoxy group, a propoxy group, an isopropoxy group or a butoxy group, in order to proceed crosslinking at the time of film formation by suppressing the degree of crosslinking inside the core-shell type resin particles (A) low.

The silanol group is a functional group in which a hydroxyl group is directly bound to a silicon atom, and is a functional group mainly generated when the hydrolyzable silyl group as mentioned above is hydrolyzed.

The hydrolyzable silyl group or silanol group is preferably a relatively bulky functional group, such as a triisopropoxysilyl group, a methyldiethoxysilyl group, or a methyldiisopropoxysilyl group.

A coating agent containing core-shell type resin particles (A) having such functional groups can suppress a crosslinking reaction inside the core-shell type resin particles (A) in a state of being dispersed in a water-based medium, and thus can maintain excellent film formability, by adjusting the potential of hydrogen (pH) to approximately 6 to 8. In order to form a coating film, a crosslinking reaction occurs between the functional groups of hydrolyzable silyl group or silanol group, or between the hydrolyzable silyl group or silanol group and the hydrolyzable silyl group or silanol group carried by the compound (B) that will be described later, and therefore, a coating film having excellent solvent resistance, water resistance or chemical resistance can be formed. The hydrolyzable silyl group or silanol group enhances the adhesiveness of the coating film to metallic base materials, and can further enhance the corrosion resistance of the coating film.

It is preferable for the hydrolyzable silyl group and silanol group to be present in an amount of 10 to 400 mmol/kg with respect to the total amount of the urethane resin(a1), so as to obtain a coating agent having excellent film formability, and capable of forming a film having excellent solvent resistance, water resistance, chemical resistance or corrosion resistance.

The urethane resin (a1) may have another functional group as necessary, in addition to the carboxyl group, carboxylate group, hydrolyzable silyl group and silanol group, and such a functional group may be an amino group, an imino group, a hydroxyl group or the like, which are functional groups capable of reacting with the compound (B) that will be described later.

It is preferable to use a urethane resin (a1) having a weight average molecular weight in the range of 5000 to 500000, and more preferably in the range of 20000 to 100000, in obtaining a coating agent capable of forming a coating film having excellent film formability and excellent solvent resistance, water resistance or chemical resistance and corrosion resistance.

Next, the vinyl polymer (a2) constituting the core layer of the core-shell type resin particles (A) will be explained.

The vinyl polymer (a2) constituting the core layer of the core-shell type resin particles (A) has a basic nitrogen atom-containing group. The basic nitrogen atom-containing group functions as a catalyst for accelerating the reaction between the carboxyl group or carboxylate group carried by the urethane resin (a1) and the epoxy group of the compound (B). Therefore, when a vinyl polymer which does not have a basic nitrogen atom-containing group is used as the vinyl polymer constituting the core layer, a coating film having excellent water resistance, chemical resistance, corrosion resistance or solvent resistance may not be formed.

Furthermore, it is essential to use the vinyl polymer (a2) having a basic nitrogen atom-containing group as the core layer, in combination with the urethane resin (a1) having an aliphatic cyclic structure having a specific mass as the shell layer, so as to provide the effects of the present invention. Therefore, for a coating agent containing core-shell type resin particles or the like in which only any one of the vinyl polymer (a2) and the urethane resin (a1) is used, a coating film having excellent water resistance, chemical resistance, corrosion resistance or solvent resistance may not be formed.

Examples of the basic nitrogen atom-containing group include a primary amino group, a secondary amino group and a tertiary amino group, and among them, the basic nitrogen atom-containing group is preferably a tertiary amino group, in order to increase the effects of accelerating the reaction between the carboxyl group or carboxylate group carried by the urethane resin (a1) and the epoxy group carried by the compound (B), and obtaining a coating agent capable of forming a coating film having excellent water resistance, chemical resistance, corrosion resistance or solvent resistance.

The content of the basic nitrogen atom-containing group is preferably 10 to 700 mmol/kg, and particularly preferably 30 to 300 mmol/kg, relative to the total amount of the vinyl polymer (a2), so that the obtainable coating film can maintain excellent solvent resistance, water resistance or chemical resistance, and good water-dispersion stability of the resin particles (A).

The content of the basic nitrogen atom-containing group relative to the total amount of the core-shell type resin particles (A) is preferably in the range of 3 to 600 mmol/kg, more preferably 10 to 250 mmol/kg, and particularly preferably 50 to 150 mmol/kg, relative to the total amount of the core-shell type resin particles (A), so that the obtainable coating film can maintain excellent solvent resistance, water resistance or chemical resistance, and good water-dispersion stability of the resin particles (A).

Furthermore, it is preferable that the vinyl polymer (a2) is a (meth)acrylic acid ester copolymer, because a coating film having more excellent solvent resistance, water resistance and chemical resistance can be formed.

The vinyl polymer (a2) may have a silicon atom-containing group to an extent that the film formability of the coating agent of the present invention is not deteriorated, but it is preferable that the vinyl polymer substantially does not have such a group. Specifically, it is preferable that the vinyl polymer (a2) substantially does not have a hydrolyzable silyl group or a silanol group such as that represented by the general formula (I).

The weight average molecular weight of the vinyl polymer (a2) is preferably in the range of 100000 to 2000000, in order to enhance the solvent resistance, water resistance or chemical resistance of the coating film.

Next, the method for producing the core-shell type resin particles (A) will be explained.

The core-shell type resin particles (A) can be obtained by, for example, a step (W) of producing an aqueous dispersion of a urethane resin (a1) by water-dispersing the urethane resin (a1) obtained by reacting polyols and polyisocyanate; and a step (X) of producing a vinyl polymer (a2) by polymerizing a vinyl monomer in the aqueous dispersion.

Specifically, polyols including a carboxyl group-containing polyol and an aliphatic cyclic structure-containing polyol are reacted with polyisocyanate in the presence of a vinyl monomer to obtain a urethane resin (a1'), subsequently part or all of the carboxyl groups carried by the urethane resin (a1') are neutralized using a basic compound, subsequently, the neutralized product is dispersed in a water-based medium. Thus, an aqueous dispersion of the urethane resin (a1) is produced (Step (X)).

Subsequently, a vinyl monomer having a basic nitrogen atom-containing group is added to the aqueous dispersion, and the vinyl monomer is polymerized in the presence of the urethane resin (a1) particles to obtain a vinyl polymer (a2). Thus, core-shell type resin particles (A) can be obtained.

When a vinyl polymer that does not have a hydrophilic group is used as the vinyl polymer (a2), the resin particles (A) can be produced by separately producing the urethane resin (a1) and the vinyl polymer (a2), and mixing them with a water-based medium.

Upon preparing the resin particles (A), if the urethane resin (a1) has high viscosity and thus is not excellent in workability, a common organic solvent such as methyl ethyl ketone or N-methylpyrrolidone, or a reactive diluent can be used. Particularly, it is preferable to use a vinyl monomer that can be used in the production of a vinyl polymer (a2) or the like as the reactive diluent, in view of decreasing the viscosity of the urethane resin (a1), enhancing the solvent resistance of the obtainable coating film, and enhancing the production efficiency of the coating agent resulting from the omission of a solvent removal process.

First, the process (W) of producing an aqueous dispersion of the urethane resin (a1) will be specifically explained.

The aqueous dispersion of the urethane resin (a1) can be produced by, specifically, producing a urethane resin (a1') containing a carboxyl group and the aliphatic cyclic structure having a specific mass, by reacting polyols including a carboxyl group-containing polyol (a1-1) and an aliphatic cyclic structure-containing polyol (a1-2) with polyisocyanate in a solvent-free state, or in the presence of an organic solvent or a vinyl monomer, subsequently neutralizing part or all of the carboxyl groups using an organic basic compound, and mixing the neutralized product with a water-based medium to obtain an aqueous dispersion.

The reaction between the polyols and the polyisocyanate is preferably carried out such that, for example, the equivalent ratio of the isocyanate group carried by the polyisocyanate to the hydroxyl group carried by the polyol is in the range of 1.05 to 3, and more preferably in the range of 1.1 to 2.

As the polyol that can be used in the production of the urethane resin (a1), for example, it is preferable to use a carboxyl group-containing polyol (a1-1) and an aliphatic cyclic structure-containing polyol (a1-2), and if necessary, other polyols.

Examples of the carboxyl group-containing polyol (a1-1) that can be used include 2,2'-dimethylolpropionic acid, 2,2'-dimethylolbutanoic acid, 2,2'-dimethylolbutyric acid, 2,2'-dimethylolvaleric acid, and the like. As for the carboxyl group-containing polyol (a1-1), a carboxyl group-containing polyester polyols obtainable by reacting the low molecular weight carboxyl group-containing polyol with various polycarboxylic acids can also be used.

Examples of the polycarboxylic acid include succinic acid, adipic acid, azelaic acid, sebacic acid, dodecanedicarboxylic acid, maleic acid, fumaric acid, 1,3-cyclopentanedicarboxylic acid, 1,4-cyclohexanedicarboxylic acid, terephthalic acid, isophthalic acid, phthalic acid, 1,4-naphthalenedicarboxylic acid, 2,5-naphthalenedicarboxylic acid, 2,6-naphthalenedicarboxylic acid, naphthalic acid, biphenyldicarboxylic acid, 1,2-bis(phenoxy)ethane-p,p'-dicarboxylic acid, and anhydrides thereof or ester-forming derivatives thereof.

Examples of the aliphatic cyclic structure-containing polyol (a1-2) include those having relatively low molecular weights, such as cyclobutanediol, cyclopentanediol, cyclohexanediol, cycloheptanediol, cyclooctanediol, cyclohexanedimethanol, hydroxypropylcyclohexanol, tricyclo[5,2,1,0,2,6]decanedimethanol, bicyclo[4,3,0]nonanediol, dicyclohexanediol, tricyclo[5,3,1,1]dodecanediol, bicyclo[4,3,0]nonanedimethanol, tricyclo[5,3,1,1]dodecanediethanol, hydroxypropyltricyclo[5,3,1,1]dodecanol, spiro[3,4]octanediol, butylcyclohexanediol, 1,1'-bicyclohexylidenediol, cyclohexanetriol, hydrogenated bisphenol A, and 1,3-adamantanediol, and these can be used individually or in combination of two or more.

As for the aliphatic cyclic structure-containing polyol (a1-2), aliphatic cyclic structure-containing polyester polyols obtainable by reacting the low molecular weight aliphatic cyclic structure-containing polyol such as described above with various polycarboxylic acids, or aliphatic cyclic structure-containing polycarbonate polyols obtainable by reacting the low molecular weight aliphatic cyclic structure-containing polyol with phosgene or the like can also be used.

As for the aliphatic cyclic structure-containing polyol (a1-2), it is preferable to use cyclohexanedimethanol, in order to further enhancing the reactivity with polyisocyanate and the water resistance, chemical resistance or corrosion resistance of the obtainable coating film.

So that the coating film maintains excellent water resistance, chemical resistance or corrosion resistance, and also increases the flexibility of the coating film, it is preferable to use the polyol having a relatively low molecular weight, and the aliphatic cyclic structure-containing polyester polyol obtainable by reacting the polyol of relatively low molecular weight and the polycarboxylic acid in combination, as the aliphatic cyclic structure-containing polyol (a1-2). The mixing ratio of the polyol of relatively low molecular weight and the aliphatic cyclic structure-containing polyester polyol is preferably such that the molar ratio of the low molecular weight polyol/aliphatic cyclic structure-containing polyester polyol is 1/0.2 to 1/3.

The polyols that can be used in the production of the urethane resin (a1) have been mentioned above, but in addition to those, if needed, polyols of relatively low molecular weight which do not have a carboxyl group or an aliphatic cyclic structure, such as ethylene glycol, propylene glycol, 1,3-propanediol, 1,4-butanediol, 1,5-pentanediol, 1,6-hexanediol, neopentyl glycol, 1,8-octanediol, diethylene glycol, triethylene glycol, tetraethylene glycol, polyethylene glycol (molecular weight 300 to 6000), dipropylene glycol, tripropylene glycol, bishydroxyethoxybenzene, bisphenol A, hydroquinone, and alkylene oxide adducts thereof; or high molecular weight polyols such as polyester polyol, polyether polyol, polycarbonate polyol, polyacetal polyol, polyacrylate polyol, polyester amide polyol, polythioether polyol, and polyolefin polyol such as polybutadiene, may also be used.

As the polyester polyol, for example, a product obtained by subjecting a low molecular weight polyol and a polycarboxylic acid to an esterification reaction; a polyester obtainable by subjecting a cyclic ester compound such as ε-caprolactone to a ring-opening polymerization reaction; a copolymerized polyester thereof, or the like can be used.

As the polyether polyol, for example, a product of addition polymerization of an alkylene oxide such as ethylene oxide or propylene oxide using one or more types of compounds having two or more active hydrogen atoms, such as ethylene glycol or diethylene glycol, as initiators, can be used.

As the polycarbonate polyol, a product obtained by reacting a glycol such as 1,4-butanediol or 1,5-pentanediol with dimethyl carbonate, phosgene or the like, can be used.

As the polyisocyanates that can be used in the production of the urethane resin (a1), for example, aromatic diisocyanates such as phenylene diisocyanate, tolylene diisocyanate, diphenylmethane diisocyanate and naphthalene diisocyanate; aliphatic or aliphatic cyclic structure-containing diisocyanates such as hexamethylene diisocyanate, lysine diisocyanate, cyclohexane diisocyanate, isophorone diisocyanate, dicyclohexylmethane diisocyanate, xylylene diisocyanate and tetramethylxylene diisocyanate; and the like can be used individually or in combination of two or more. Among them, it is preferable to use an aliphatic cyclic structure-containing polyisocyanate (a1-3), in view of obtaining a coating agent capable of forming a coating film which is excellent in water resistance, chemical resistance or corrosion resistance, by further increasing the amount of the aliphatic cyclic structure in the urethane resin (a1).

Specific examples of the aliphatic cyclic structure-containing polyisocyanate (a1-3) include isophorone diisocyanate, bis(isocyanatomethyl)cyclohexane, dicyclohexylmethane diisocyanate, cyclohexane diisocyanate, methylcyclohexane diisocyanate, dicyclohexyldimethylmethane diisocyanate, 2,2'-dimethyldicyclohexylmethane diisocyanate, bis(4-isocyanato-n-butylidene)pentaerythritol, dimer acid diisocyanate, 2-isocyanatomethyl-3-(3-isocyanatopropyl)-5-isocyanatomethyl-bicyclo[2,2,1]-heptane, 2-isocyanatomethyl-3-(3-isocyanatopropyl)-6-isocyanatomethyl-bicyclo[2,2,1]-heptane, 2-isocyanatomethyl-2(3-isocyanatopropyl)-5-isocyanatomethyl-bicyclo[2,2,1]-heptane, 2-isocyanatomethyl-2-(3-isocyanatopropyl)-6-isocyanatomethyl-bicyclo[2,2,1]-heptane, 2-isocyanatomethyl-3-(3-isocyanatopropyl)-6-(2-isocyanatoethyl)-bicyclo[2,2,1]-heptane, 2-isocyanatomethyl-3-(3-isocyanatopropyl)-6-(2-isocyanatoethyl)-bicyclo[2,1,1]-heptane, 2-isocyanatomethyl-2-(3-isocyanatopropyl)-5-(2-isocyanatoethyl)-bicyclo[2,2,1]-heptane, 2-isocyanatomethyl-2-(3-isocyanatopropyl)-6-(2-isocyanatoethyl)-bicyclo[2,2,1]-heptane, norbornene diisocyanate and the like can be used individually, or in combination of two or more kinds.

Among these, particularly in order to further enhance the water resistance, chemical resistance or corrosion resistance of the coating film formed by the coating agent of the present invention, it is preferable to use isophorone diisocyanate, dicyclohexylmethane diisocyanate, or norbornene diisocyanate.

The reaction between the polyol and the polyisocyanate can be usually carried out at a temperature range of 50 to 150° C.

In order to disperse the urethane resin (a1') obtained by reacting the polyol and the polyisocyanate in a water-based medium, it is preferable to use a method of mixing the urethane resin (a1) obtained by neutralizing the carboxyl group carried by the urethane resin (a1') with a basic compound, with a water-based medium.

As the basic compound that can be used in the neutralization, for example, amines such as ammonia, triethylamine and morpholine, or alkanolamines such as monoethanolamine and diethanolamine can be used.

Among these, particularly, it is preferable to use triethylamine as the organic basic compound, in view of obtaining a coating film having excellent water resistance and solvent resistance.

In the neutralization of the carboxyl group, an inorganic basic compound such as sodium hydroxide or potassium hydroxide may be used, but it is preferable in the present invention to use the organic basic compound. An inorganic basic compound tends to inhibit the reaction between the carboxyl group or carboxylate group carried by the urethane resin (a1) and the epoxy group carried by the compound (B)

that will be described later, and slightly decrease the water resistance, solvent resistance or the like of the coating film formed.

In regard to the amount of use of the basic compound, in order to enhance the water-dispersion stability of the obtainable core-shell type resin particles (A), it is preferable to use the basic compound to the extent that the ratio of [basic compound/carboxyl group] is 0.5 to 3.0 (molar ratio) with respect to the total amount of the carboxyl groups carried by the core-shell type resin particles (A), and it is more preferable to use the compound to the extent that the ratio is 0.9 to 2.0 (molar ratio).

In mixing of the urethane resin (a1) with the water-based medium, a machine such as a homogenizer may be used as necessary.

In the production of the urethane resin (a1), a chain extending agent such as polyamine may be used as necessary, for the purpose of designing a polyurethane resin having various properties such as mechanical properties or thermal properties.

Examples of such a polyamine include diamines such as ethylenediamine, 1,2-propanediamine, 1,6-hexamethylenediamine, piperazine, 2,5-dimethylpiperazine, isophoronediamine, 4,4'-dicyclohexylmethanediamine, 3,3'-dimethyl-4,4'-dicyclohexylmethanediamine and 1,4-cyclohexanediamine; diamines each containing one primary amino group and one secondary amino group, such as N-hydroxymethylaminoethylamine, N-hydroxyethylaminoethylamine, N-hydroxypropylaminopropylamine, N-ethylaminoethylamine and N-methylaminopropylamine; polyamines such as diethylenetriamine, dipropylenetriamine and triethylenetetramine; hydrazines such as hydrazine, N,N'-dimethylhydrazine, and 1,6-hexamethylenebishydrazine; dihydrazides such as succinic acid dihydrazide, adipic acid dihydrazide, glutaric acid dihydrazide, sebacic acid dihydrazide and isophthalic acid dihydrazide; and semicarbazides such as β-semicarbazide propionic acid hydrazide, 3-semicarbazide propylcarbazinic acid ester, and semicarbazide-3-semicarbazide methyl-3,5,5-trimethylcyclohexane.

The polyamine is preferably used such that the equivalent ratio of the amino group carried by the polyamine and the isocyanate group carried by the urethane resin (a1) is in the range of 1.9 or less (equivalent ratio), and more preferably in the range of 0.3 to 1.0 (equivalent ratio). When the chain extending agent is used in the range mentioned above, the solvent resistance or mechanical strength of the coating film formed by the obtainable coating agent can be enhanced.

The chain extension reaction is preferably carried out by making the urethane resin (a1) aqueous by the method described above, and then mixing the aqueous dispersion of the urethane resin (a1) with the chain extending agent.

Upon producing the urethane resin (a1), a reactive diluent can be used according to necessity. As the reactive diluent, it is preferable to use a vinyl monomer that can be used in the production of the vinyl polymer (a2).

As the method for producing the urethane resin (a1) using a vinyl monomer as the reactive diluent, the polyols and the polyisocyanate are allowed to react in the presence of the vinyl monomer to produce a urethane resin (a1'), and then a mixture of the urethane resin (a1') and the vinyl monomer is dispersed in the water-based medium.

Subsequently, by polymerizing the vinyl monomer inside the urethane resin (a1) particles dispersed in the water-based medium, the core-shell type resin particles (A) having the urethane resin (a1) in the shell layer and the vinyl polymer (a2) in the core layer can be produced.

In this case, it is preferable that the vinyl monomer of the reactive diluent does not include a vinyl monomer having a basic nitrogen atom-containing group. When a vinyl monomer having a basic nitrogen atom-containing group is present upon producing the urethane resin (a1), it becomes difficult for the carboxyl group being introduced to the urethane resin (a1), to be incorporated into the urethane resin (a1), and the dispersibility of the urethane resin (a1) in water tends to slightly decrease, which is not preferable.

Therefore, when the urethane resin (a1) is produced in the presence of a vinyl monomer that does not include a vinyl monomer having a basic nitrogen atom-containing group, the urethane resin (a1) is neutralized using a basic compound, and the neutralization product is dispersed in a water-based medium, an aqueous dispersion of the urethane resin (a1) and the vinyl monomer is obtained. Subsequently, a vinyl monomer having a basic nitrogen atom-containing group is added, and a polymerization initiator that will be described later is used, to thereby polymerize the vinyl monomer that does not contain a basic nitrogen atom-containing group used as a reactive diluent and the vinyl monomer having a basic nitrogen atom-containing group added in the middle of the reaction, in the presence of the urethane resin (a1) particles. Thus, the core-shell type resin particles (A) having a vinyl polymer (a2) in the core layer are produced. This method is preferable in view of enhancing the stability upon the polymerization of the vinyl monomers (aggregation of particles or the like is difficult to occur), or enhancing the dispersion stability of the obtained resin particles (A).

Next, the process (X) of producing a vinyl polymer (a2) by polymerizing a vinyl monomer in the aqueous dispersion obtained from the process (W) will be explained.

As the vinyl polymer (a2) that constitutes the core layer of the core-shell type resin particles (A) used in the present invention, products obtained by polymerizing various vinyl monomers including the vinyl monomer having a basic nitrogen atom-containing group in the presence of a polymerization initiator, can be used.

The vinyl monomer containing the basic nitrogen atom-containing group is not particularly limited so long as it can accelerate a reaction between the carboxyl group or carboxylate group carried by the urethane resin (a1) and the epoxy group of the compound (B), and for example, tertiary amino group-containing vinyl monomers such as N,N-dimethylaminoethyl (meth)acrylate, N,N-dimethylaminopropyl (meth)acrylate, N,N-diethylaminoethyl (meth)acrylate, N,N-diethylaminopropyl (meth)acrylate, N,N-diethylaminopropyl (meth)acrylate, N-[2-(meth)acryloyloxyethyl]piperidine, N-[2-(meth)acryloyloxyethyl]pyrrolidine, N-[2-(meth)acryloyloxyethyl]morpholine, 4-[N,N-dimethylamino]styrene, 4-[N,N-diethylamino]styrene, 2-vinylpyridine and 4-vinylpyridine; secondary amino group-containing vinyl monomers such as N-methylaminoethyl (meth)acrylate and N-t-butylaminoethyl (meth)acrylate; primary amino group-containing vinyl monomers such as aminomethyl acrylate, aminoethyl acrylate, aminopropyl (meth)acrylate, amino-n-butyl (meth)acrylate, butylvinylbenzylamine, vinylphenylamine and p-aminostyrene; and the like can be used individually or as mixtures of two or more.

Among them, it is preferable to use a tertiary amino group-containing vinyl monomer, so that the effect of accelerating the reaction between the carboxyl group carried by the urethane resin (a1) and the epoxy group carried by the compound (B) is increased, and a coating agent capable of forming a coating film having excellent water resistance, chemical resistance, corrosion resistance or solvent resistance is obtained.

As the tertiary amino group-containing vinyl monomer, it is preferable to use a (meth)acrylic acid ester monomer containing a tertiary amino group, so that in the case of using a (meth)acrylic acid ester as another vinyl monomer that will be described later, it is easy to copolymerize, and the solvent resistance of the obtainable coating film can be further enhanced.

As the (meth)acrylic acid ester monomer containing a tertiary amino group, it is preferable to use, for example, acrylates such as N,N-dimethylaminoethyl (meth)acrylate, N,N-dimethylaminopropyl (meth)acrylate, N,N-diethylaminoethyl (meth)acrylate, N,N-dimethylaminopropyl (meth)acrylate and N,N-diethylaminopropyl (meth)acrylate, and the like.

The vinyl monomer containing a basic nitrogen atom-containing group is preferably used in an amount in the range of 0.1 to 10 mass % relative to the total amount of the vinyl monomer used in the production of the vinyl polymer (a2).

In the production of the vinyl polymer (a2), the amount of the basic nitrogen atom-containing group in the vinyl polymer (a2) can be appropriately adjusted by using another vinyl monomer that does not have the basic nitrogen atom-containing group in combination, in addition to the vinyl monomer containing a basic nitrogen atom-containing group.

Examples of the other vinyl monomer include (meth) acrylic acid esters such as methyl (meth)acrylate, ethyl (meth)acrylate, n-butyl (meth)acrylate, i-butyl (meth)acrylate, t-butyl (meth)acrylate, 2-ethylhexyl (meth)acrylate, hexyl (meth)acrylate, cyclohexyl (meth)acrylate, octyl (meth)acrylate, nonyl (meth)acrylate, dodecyl (meth)acrylate, stearyl (meth)acrylate, isobornyl (meth)acrylate, dicyclopentanyl (meth)acrylate, phenyl (meth)acrylate and benzyl (meth)acrylate; fluorine-containing vinyl monomers such as 2,2,2-trifluoroethyl (meth)acrylate, 2,2,3,3-pentafluoropropyl (meth)acrylate and perfluorocyclohexyl (meth)acrylate; vinyl esters such as vinyl acetate, vinyl propionate and vinyl versatate; vinyl ethers such as methyl vinyl ether, ethyl vinyl ether, propyl vinyl ether and butyl vinyl ether; nitriles of unsaturated carboxylic acids such as (meth)acrylonitrile; vinyl compounds having aromatic rings such as styrene, α-methylstyrene and divinylstyrene; isoprene, chloroprene, butadiene, ethylene, tetrafluoroethylene, vinylidene fluoride, N-vinylpyrrolidone, and the like; epoxy group-containing polymerizable monomers such as glycidyl (meth)acrylate and allyl glycidyl ether; hydroxyl group-containing polymerizable monomers such as 2-hydroxyethyl (meth)acrylate, 2-hydroxypropyl (meth)acrylate and polyethylene glycol mono(meth)acrylate; amide group-containing polymerizable monomers such as (meth)acrylamide, N-monoalkyl (meth)acrylamide and N,N-dialkyl (meth)acrylamide; methylolamide group and its alkoxide-containing polymerizable monomers such as N-methylol (meth)acrylamide, N-isopropoxymethyl (meth)acrylamide, N-butoxymethyl (meth)acrylamide and N-isobutoxymethyl (meth)acrylamide; aziridinyl group-containing polymerizable monomers such as 2-aziridinylethyl (meth)acrylate; isocyanate group and/or blocked isocyanate group-containing polymerizable monomers such as (meth)acryloyl isocyanate, and phenyl adduct of ethyl (meth)acryloyl isocyanate; oxazoline-group containing polymerizable monomers such as 2-isopropenyl-2-oxazoline, 2-vinyl-2-oxazoline and 2-oxazolidinylethyl (meth)acrylate; cyclopentenyl group-containing polymerizable monomers such as dicyclopentenyl (meth)acrylate; carbonyl group-containing polymerizable monomer such as acrolein and diacetone (meth)acrylamide; acetoacetyl group-containing polymerizable monomers such as acetoacetoxy- ethyl (meth)acrylate; and the like. These can be used individually or as mixtures of two or more.

Among them, as the other vinyl monomer, it is preferable to use (meth)acrylic acid ester monomers such as methyl (meth) acrylate, ethyl (meth)acrylate, n-butyl (meth)acrylate, i-butyl (meth)acrylate, t-butyl (meth)acrylate, 2-ethylhexyl (meth) acrylate, hexyl (meth)acrylate, cyclohexyl (meth)acrylate and isobornyl (meth)acrylate, and it is preferable to use these in an amount in the range of 70 to 100 mass % with respect to the total amount of the vinyl monomer used in the production of the vinyl polymer (a2), so that the solvent resistance, water resistance, chemical resistance and the like of the obtainable coating film are excellent.

The polymerization of the vinyl polymer (a2) may be carried out by a method of feeding vinyl monomers and polymerization initiators into an aqueous dispersion of the urethane resin (a1) separately or as a mixture, all at one time or in portions, and polymerizing the vinyl monomers in the urethane resin (a1) particles dispersed in a water-based medium.

In this case, the vinyl monomer needs to be supplied alone into the aqueous dispersion of the urethane resin (a1), without using any surfactants. Thereby, the vinyl monomers cannot exist stably in the water-based medium, and undergo polymerization inside the urethane resin (a1) particles which already exist. As a result, core-shell type resin particles (A) having a urethane resin (a1) in the shell layer and a vinyl polymer (a2) in the core layer can be produced.

As the polymerization initiator that can be used in the production of the vinyl polymer (a2), for example, radical polymerization initiators such as persulfate salts, organic peroxides, and hydrogen peroxide; or azo initiators 4,4'-azobis (4-cyanovaleric acid), 2,2'-azobis(2-amidinopropane) dihydrochloride can be used. Furthermore, the radical polymerization initiator may also be used as a redox polymerization initiator in combination with the reducing agent that will be described later.

Examples of the persulfates, which are representative of polymerization initiators, potassium persulfate, sodium persulfate, and ammonium persulfate, and specific examples of the organic peroxides include diacyl proxides such as benzoyl peroxide, lauryl peroxide, decanoyl peroxide; dialkyl peroxides such as t-butyl cumyl peroxide and dicumyl peroxide; and peroxy esters such as t-butyl peroxylaurate and t-butyl peroxybenzoate; hydroperoxides such as cumene hydroperoxide, paramenthane hydroperoxide and t-butyl hydroperoxide.

Examples of the reducing agent include ascorbic acid and salts thereof, erysorbic acid and salts thereof, tartaric acid and salts thereof, citric acid and salts thereof, metal salts of formaldehyde sulfoxylate, sodium thiosulfate, sodium bisulfite, and ferric chloride.

The amount of use of the polymerization initiator may be any amount that allows the polymerization to occur smoothly, but is preferably smaller so that the obtainable coating film maintains excellent water resistance. The amount of use is preferably 0.01 to 0.5 mass % with respect to the total amount of the vinyl monomers used in the production of the vinyl polymer (a2). Also, in the case of using the polymerization initiator with the reducing agent in combination, the amount of use in total is also preferably within in the range mentioned above.

Next, the compound (B) having a hydrolyzable silyl group or a silanol group and an epoxy group used in the present invention will be described.

The compound (B) is a very important constituent component in reacting the carboxyl group carried by the core-shell type resin particles (A) and forming a crosslinked coating film having excellent solvent resistance. Also, in the case of using the coating agent as a coating agent for metallic base materials, the hydrolyzable silyl group or silanol group of the compound (B) increase the adhesiveness to the metal of the base material, and as a result, a coating film having excellent corrosion resistance is formed.

Meanwhile, there are cases where coating films having excellent water resistance, solvent resistance and corrosion resistance cannot be formed, even if a polyfunctional epoxy compound such as, sorbitol polyglycidyl ether, propylene glycol diglycidyl ether, trimethylolpropane triglycidyl ether, or pentaerythritol tetraglycidyl ether, is used instead of the compound (B) as a crosslinking agent of the core-shell type resin particles (A).

As such, in order to solve the problems, it is important to use the compound (B) as a specific crosslinking agent in combination with the core-shell type resin particles (A).

The compound (B) has one or both of a hydrolyzable silyl group and a silanol group. The hydrolyzable silyl group or silanol group reacts with the functional group carried by the core-shell type resin particles (A) and forms a crosslinked structure.

The hydrolyzable silyl group and silanol group also acts as a silane coupling agent that binds the core-shell type resin particles (A) and the base material for coating, it has an effect of significantly increasing the adhesiveness to a metallic base material or a plastic base material. When the coating agent of the present invention is coated on a metallic base material, a coating film having very excellent corrosion resistance can be formed.

As the hydrolyzable silyl group, for example, those hydrolyzable silyl groups exemplified as any functional group that is carried by the urethane resin (a1) can be used.

Among them, it is preferable to use an alkoxysilyl group, since the crosslinkability is high and the solvent resistance increases. Particularly, as the alkoxysilyl group, it is preferable to use a trimethoxysilyl group or a triethoxysilyl group because the crosslinkability is excellent and the solvent resistance increases.

The epoxy group carried by the compound (B) reacts with the carboxyl group carried by the resin particles (A). Thereby, it is possible to form a crosslinked coating film having very excellent solvent resistance.

Examples of the compound (B) include epoxysilane compounds such as γ-glycidoxypropyltrimethoxysilane, γ-glycidoxypropyltriethoxysilane, γ-glycidoxypropylmethyldimethoxysilane, γ-glycidoxypropylmethyldiethoxysilane, 2-(3,4-epoxycyclohexyl)ethyltrimethoxysilane, 2-(3,4-epoxycyclohexyl)ethyltriethoxysilane, 2-(3,4-epoxycyclohexyl)ethylmethyldiethoxysilane, and γ-glycidoxypropyltriisopropyloxysilane.

Furthermore, adducts of isocyanatosilanes such as γ-isocyanatopropyltriisopropyloxysilane and γ-isocyanatopropyltrimethoxysilane with glycidol; adducts of aminosilanes such as γ-aminopropyltrimethoxysilane with diepoxy compounds; or compounds obtainable by partial hydrolysis condensation of epoxysilane can also be used.

Among them, it is preferable to use at least one selected from the group consisting of γ-glycidoxypropyltrimethoxysilane, γ-glycidoxypropyltriethoxysilane, and 2-(3,4-epoxycyclohexyl)ethyltrimethoxysilane, because the crosslinking density of the coating film is enhanced, and the solvent resistance becomes good.

The compound (B) is preferably used in an amount in the range of 0.3 to 3.0 moles per 1 moles of the carboxyl group or carboxylate group carried by the core-shell type resin particles (A), in forming a coating film having excellent solvent resistance and obtaining the coating agent of the present invention having excellent storage stability.

The coating agent of the present invention can contain various additives in combination as necessary. Among them, it is preferable to use a curing catalyst in order to form a crosslinked coating film having excellent solvent resistance.

Examples of the curing catalyst include lithium hydroxide, sodium hydroxide, potassium hydroxide, sodium methylate, tetraisopropyl titanate, tetra-n-butyl titanate, tin octylate, lead octylate, cobalt octylate, zinc octylate, calcium octylate, zinc naphthenate, cobalt naphthenate, di-n-butyltin diacetate, di-n-butyltin dioctoate, di-n-butyltin dilaurate, di-n-butyltin maleate, p-toluenesulfonic acid, trichloroacetic acid, phosphoric acid, monoalkyl phosphate, dialkyl phosphate, monoalkyl phosphite, dialkyl phosphite, and the like.

As the water-based medium used in the present invention, only water may be used, or a mixed solution of water and a water-soluble solvent may also be used. Examples of the water-soluble solvent include alcohols such as methyl alcohol, ethyl alcohol, isopropyl alcohol, ethylcarbitol, ethylcellosolve, and butylcellosolve; and polar solvents such as methyl ethyl ketone and N-methylpyrrolidone. These can be used individually or as mixtures of two or more.

The amount of use of the water-soluble solvent is preferably reduced as far as possible, upon considering the danger of inflammation of the aqueous resin composition of the present invention and safety. Therefore, it is particularly preferable to use water only as the water-based medium.

The coating agent of the present invention preferably contains non-volatile components in an amount of 20 to 70 mass %, and more preferably in the range of 25 to 60 mass %, in order to suppress the rapid viscosity increase during production and increasing the productivity, ease of coating or dryability of the resin composition.

The coating agent of the present invention may also contain an emulsifer, a dispersion stabilizer or a leveling agent as necessary, but in order to suppress a decrease in the water resistance of the crosslinked coating film, the coating agent preferably does not contain them as far as possible, and it is preferable that the content is 0.5 mass % based on the solid fraction of the aqueous resin composition.

As such, the coating agent of the present invention can be used for the purpose of surface protection of various base materials or imparting design freedom to various base materials.

Examples of the base material include various plastics or films thereof, metals, glass, paper, and wood. Particularly, when the coating agent of the present invention is used in various plastic base materials, coating films having excellent solvent resistance and water resistance can be obtained even with a relatively low temperature drying process, and peeling of the coating film from the plastic base materials can be prevented.

Examples of the plastic base material generally include acrylonitrile-butadiene-styrene resins (ABS resins), polycarbonate resin (PC resins), ABS/PC resins, polystyrene resins (PS resins), polymethyl methacrylate resins (PMMA resins), acrylic resins, polypropylene resins, and polyethylene resins, which are employed in plastic molded products such as mobile telephones, electric appliances, interior and exterior decoration materials for automobiles, and office instruments. As the plastic film base material, polyethylene terephthalate film, polyester film, polyethylene film, polypropylene film, TAC (triacetylcellulose) film, polycabonate film, polyvinyl chloride film and the like can be used.

The coating agent of the present invention can form a densely formed crosslinked coating film which can inhibit corrosion of the metallic material itself, and therefore can be suitably used as a coating agent for metallic base materials.

As the metallic base material, for example, electroplated steel sheets such as zinc-plated steel sheets and aluminum-zinc alloy steel sheets, aluminum sheet, aluminum alloy sheet, electromagnetic steel sheet, copper sheet, stainless steel sheet and the like, which are used in the applications of automobile, electric appliances, and construction materials, can be used.

The coating agent of the present invention can exhibit very excellent solvent resistance against organic solvents such as methanol, ethanol, isopropyl alcohol, acetone, methyl ethyl ketone, and toluene, even though the crosslinked coating film has a thickness of about 5 µm. The coating agent of the present invention can form a coating film having excellent chemical resistance including acid resistance and alkali resistance, even when the thickness is about 1 µm.

The coating agent of the present invention can form a coating film by coating on a base material, drying and curing.

The method for coating of the coating agent may be, for example, a spray method, a curtain coater method, a flow coater method, a roll coater method, and a brushing method an immersion method.

The drying may be natural drying at ambient temperature, or may be drying under heating. The drying under heating is usually preferably performed at 40 to 250° C., and for a time of about 1 to 600 seconds.

When the base material is susceptible to thermal deformation, such as a plastic base material, it is preferable to adjust the temperature for drying the coating film to approximately 80° C. or lower. Here, the coating film obtainable by drying a conventional coating agent at a temperature of 80° C. or lower, may not have sufficient solvent resistance. On the contrary, the coating agent of the present can of a crosslinked coating film showing excellent solvent resistance, water resistance or chemical resistance, even if the coating agent is dried at a temperature of 80° C. or lower for a short time of about several seconds, since the crosslinking reaction of the coating film proceeds at low temperature (ambient temperature) after drying.

EXAMPLES

Hereinafter, the present invention will be specifically explained with reference to Examples and Comparative Examples.

Various evaluation methods will be described below.

[Measurement of Light Transmittance of Mixed Liquid of Core-Shell Type Resin Particles and Tetrahydrofuran]

As an index for examining the crosslinking density of the resin particles (A) in the coating agent, the light transmittance of the mixed liquid of the core-shell type resin particles and tetrahydrofuran was measured.

Specifically, 25 parts by mass of a mixed liquid having 4 mass % of non-volatile components was prepared by mixing an aqueous dispersion of the core-shell type resin particles having the content of non-volatile components adjusted to 30 mass % with tetrahydrofuran, and stirring the mixture for 24 hours.

The light transmittance of the obtained mixed liquid was measured using an absorption spectrophotometer UV-1200 manufactured by Shimadzu Corp. under the conditions of wavelength: 640 nm, and quartz cell length (length of light transmittance): 50 mm.

The core-shell type resin particles having a light transmittance of 70% or greater were considered such that no crosslinked structure was formed inside the particles, or if a crosslinked structure were ever formed, the extent was very small and not at a level to cause decreases in the properties such as film formability.

[Measurement of Acid Value]

The urethane resin (a1) was coated on a glass plate using a 3 mil applicator, and was dried at ambient temperature for 1 hour to produce a half-dried coating film. The obtained coating film was peeled off from the glass plate, and 1 g was precisely weighed and dissolved in 100 g of tetrahydrofuran. This was used as a measurement sample.

The measurement was carried out by a neutralization titration method using an aqueous solution of potassium hydroxide. To a tetrahydrofuran solution dissolving the measurement sample, two drops of phenolphthalein were added, and a 0.1 N aqueous solution of potassium hydroxide was added dropwise. The time at which the color of the solution changed from colorless to pale peach color was taken as the completion point, and the consumed amount of potassium hydroxide was measured. The amount of potassium hydroxide (in milligrams) was then determined.

[Measurement of Weight Average Molecular Weight]

The weight average molecular weight of the urethane resin (a1) was measured by gel permeation chromatography (GPC method).

The urethane resin (a1) was coated on a glass plate with a 3 mil applicator, and was dried at ambient temperature for 1 hour to produce a half-dried coating film. The obtained coating film was peeled off from the glass plate, and 0.4 g was dissolved in 100 g of tetrahydrofuran. This was used as a measurement sample.

As the measuring apparatus, high performance liquid chromatograph HLC-8220 manufactured by Tosoh Corp. was used. For the column, TSK-GEL columns (HXL-H, G5000HXL, G4000HXL, G3000HXL and G2000HXL) manufactured by Tosoh Corp. were combined and used.

As standard samples, a calibration curve was produced using standard polystyrenes (molecular weight: 4,480,000, 4,250,000, 2,880,000, 2,750,000, 1,850,000, 860,000, 450,000, 411,000, 355,000, 190,000, 160,000, 96,400, 50,000, 37,900, 19,800, 19,600, 5,570, 4,000, 2,980, 2,030, and 500) manufactured by Showa Denko K.K. and Toyo Soda Manufacturing Co., Ltd.

The weight average molecular weight was measured using tetrahydrofuran as an eluent and a sample dissolvent, at a flow rate of 1 mL/min, a sample injection amount of 500 µL and a sample concentration of 0.4%, using an RI detector.

[Content of Aliphatic Cyclic Structure]

The content of the aliphatic cyclic structure of the urethane resin (a1) was calculated from the fed amount of the raw materials containing the aliphatic cyclic structure used in the production of the urethane resin (a1).

[Measurement Method for Average Particle Size]

The average particle size of the core-shell type resin particles (A) was 50% median diameter on a volume basis, and was measured using a Microtrack UPA250 particle size distribution measuring apparatus manufactured by Nikkiso Co., Ltd. according to a dynamic light scattering method.

[Solvent Resistance Test]

The coating agents obtained from the Examples and Comparative Examples were coated on 55 mass % aluminum-zinc alloy-plated steel sheets degreased with acetone, using a 3 mil applicator, and (1) coating films dried at 25° C. for 7 days and (2) coating films dried at 140° C. for 20 minutes were produced. The surfaces of the obtained coatings were rubbed 100 times at a same site using a cotton swab soaked in ethanol, and the presence or absence of deterioration of the coating films was observed.

The surfaces of the coating films produced by the same method as described above were rubbed 100 times using a cotton swab soaked in methyl ethyl ketone, and the presence or absence of deterioration of the coating films was observed.

A: There was no change on the surface of the coating film.

B: Slight dissolution of the coating film was seen, but it was of a level practically free of problems.

C: Coating films at a proportion of from 10% to less than 30% based on total coating films, were observed with dissolution or detachment from the base material.

D: Coating films at a proportion of 30% or more based on total coating films were observed with dissolution or detachment from the base material.

[Evaluation of Chemical Resistance (Acid Resistance)]

The coating agents obtained in the Examples and Comparative Examples were coated on 55 mass % aluminum-zinc alloy-plated steel sheets degreased with acetone, using a bar coater such that the film thickness after drying was about 5 µm, and the coating agents were dried in a dryer at an atmospheric temperature of 80° C. for 20 seconds to produce coating films. Thereafter, the coating films were aged for 3 days at room temperature and were used as specimens.

1 N hydrochloric acid was dropped on a spot on the coating film, and the state of deterioration of the coating film after standing for 180 minutes was observed.

A: There was no change on the surface of the coating film.

B: Slight yellowing was seen on the surface of the coating film, but it was of a level practically free of problem.

C: The surface of the coating film was conspicuously discolored.

D: The coating film was dissolved, and the base material was exposed.

[Evaluation of Chemical Resistance (Alkali Resistance)]

The coating agents obtained in the Examples and Comparative Examples were coated on 55 mass % aluminum-zinc alloy-plated steel sheets degreased with acetone, using a bar coater such that the film thickness after drying was about 5 µm, and the coating agents were dried in a dryer at an atmospheric temperature of 80° C. for 20 seconds to produce coating films. Thereafter, the coating films were aged for 3 days at room temperature and were used as specimens.

A 5 mass % aqueous solution of sodium hydroxide was dropped on a spot on the coating film, and the state of deterioration of the coating film after standing for 20 minutes was observed.

A: There was no change on the surface of the coating film.

B: Slight yellowing was seen on the surface of the coating film, but it was of a level practically free of problems.

C: The surface of the coating film was conspicuously discolored.

D: The coating film was dissolved, and the base material was exposed.

[Evaluation of Water Resistance (Hot Water Resistance)]

The coating agents obtained in the Examples and Comparative Examples were coated on 55 mass % aluminum-zinc alloy-plated steel sheets degreased with acetone, using a bar coater such that the film thickness after drying was about 5 µm, and the coating agents were dried in a dryer at an atmospheric temperature of 80° C. for 20 seconds to produce coating films. Thereafter, the coating films were aged for 3 days at room temperature and were used as specimens.

The specimens were immersed in water at 50° C., and the state of deterioration of the coating film after 300 minutes was observed.

A: There was no change on the surface of the coating film.

B: Slight yellowing was seen on a very small part of the surface of the coating film, but it was of a level practically free of problems.

C: Swelling or the like was seen over the whole coating film.

D: The coating film peeled off, and the base material was exposed.

[Adhesiveness to Plastic Base Material (Primary Adhesiveness)]

The coating agents obtained in the Examples and Comparative Examples were coated on each of the plastic base materials shown below using a 3 mil applicator, and the coating agents were dried at 60° C. for 30 minutes and aged for 2 days at 25° C. to produce coating films. On the surface of the obtained coating films, a Cellotape (registered trademark) peeling test on 100 crosscuts, each measuring 1 mm on each edge, was carried out according to JIS K-5400. The number of crosscuts which did not peel off was observed, and evaluation was made on the following criteria. Here, the plastic base materials used were base materials formed from an acrylonitrile-butadiene-styrene resin (ABS resin), base materials formed from a polycarbonate resin (PC resin), base materials formed from a polymer alloy of an acrylonitrile-butadiene-styrene resin and a polycarbonate resin (ABS/PC resin), base materials formed from a polymethyl methacrylate resin (PMMA resin), and base materials formed from a polystyrene resin (PS resin).

A: The number of crosscuts which did not peel off was 90 or more.

B: The number of crosscuts which did not peel off was 60 or more and less than 90.

C: The number of crosscuts which did not peel off was 40 or more and less than 60.

D: The number of crosscuts which did not peel off was less than 40.

[Adhesiveness to Plastic Base Material (Hot Water Adhesiveness)]

The same coating films as those used in the primary adhesiveness test were produced as test specimens, and the specimens were immersed in hot water at 50° C. for 5 hours. The specimens were taken out, and the water on the surface was wiped out. The same peeling test as that for the primary adhesiveness was carried out, and the results were evaluated based on the following criteria.

A: The number of crosscuts which did not peel off was 90 or more.

B: The number of crosscuts which did not peel off was 60 or more and less than 90.

C: The number of crosscuts which did not peel off was 40 or more and less than 60.

D: The number of crosscuts which did not peel off was less than 40.

[Evaluation of Corrosion Resistance]

The coating agents obtained in the Examples and Comparative Examples were coated on 55 mass % aluminum-zinc alloy-plated steel sheets degreased with acetone, using a bar coater such that the film thickness after drying was about 5 µm, and the coating agents were dried in a dryer at an atmospheric temperature of 80° C. for 20 seconds to produce coating films. Thereafter, the coating films were aged for 3 days at room temperature and were used as specimens.

The surface of the coating film was cut with a cutter knife to a depth reaching the base material (crosscut part), and a brine spray test was carried out with a brine spray tester manufactured by Suga Test Instruments Co., Ltd. The area of rust generation after 240 hours was determined by visual inspection and evaluated. The evaluation was performed by dividing the area into a plane part which was not cut by a cutter knife, and a peripheral part of the crosscut part.

<Plane Part>

A: The area of rust generation and swell or peeling of the coating film due to the rust was less than 5% of the total area of the plane part.

B: The area of rust generation and swell or peeling of the coating film due to the rust was 5% or larger and less than 30% of the total area of the plane part.

C: The area of rust generation and swell or peeling of the coating film due to the rust was 30% or larger and less than 60% of the total area of the plane part.

D: The area of rust generation and swell or peeling of the coating film due to the rust was 60% or larger of the total area of the plane part.

<Peripheral Part of Crosscut Part>

A: Rust generation at the peripheral part of the crosscut part was not seen, and peeling of the coating film due to the rust was not seen.

B: A trace amount of rust generation at the peripheral part of the crosscut part was observed, but peeling or swelling of the coating film due to the rust was not seen.

C: A large area of rust generation at the peripheral part of the crosscut part was observed, and peeling or swelling of the coating film due to the rust was observed, but streaming rust was not seen.

D: A large area of rust generation at the peripheral part of the crosscut part, and peeling or swelling of the coating film due to the rust were observed, and contamination of the coating film due to streaming rust was observed.

Reference Example 1

Production of Urethane Resin (a1)-1

In a nitrogen-purged vessel equipped with a thermometer, a nitrogen gas inlet, and a stirrer, 100 parts by mass of polyester polyol (a polyester polyol obtained by reacting 1,4-cyclohexanedimethanol and neopentyl glycol with adipic acid, the content of the aliphatic cyclic structure in the polyester polyol was 1425 mmol/kg, the hydroxyl group equivalent was 1000 g/equivalent), 17.6 parts by mass of 2,2-dimethylolpropionic acid, 21.7 parts by mass of 1,4-cyclohexanedimethanol, and 106.2 parts by mass of dicyclohexylmethane diisocyanate were reacted in a mixed solvent of 59 parts by mass of methyl ethyl ketone and 119 parts by mass of N-methyl-2-pyrrolidone. Thus, an organic solvent solution of a urethane prepolymer having an isocyanate group at the molecule end was obtained.

Subsequently, 13 parts by mass of triethylamine was added to the organic solvent solution of the urethane resin to partially or completely neutralize the carboxyl groups carried by the urethane resin. 375 parts by mass of water was further added and the mixture was stirred sufficiently. Thus, an aqueous dispersion of a urethane resin having an aliphatic cyclic structure and a carboxyl group was obtained.

Subsequently, 8 parts by mass of a 25 mass % aqueous solution of ethylenediamine was added to the aqueous dispersion and stirred to perform chain extension of the polyurethane resin in the particle form. The polyurethane resin was subjected to aging and solvent removal, and thus an aqueous dispersion of the urethane resin (a1)-1 having a solid content of 30 mass % was obtained. Here, the obtained urethane resin (a1)-1 had an acid value of 30, a content of the aliphatic cyclic structure calculated from the ratio of fed raw materials of 4452 mmol/kg, and a weight average molecular weight of 53,000.

Reference Example 2

Production of Urethane Resin (a1)-2

In a nitrogen-purged vessel equipped with a thermometer, a nitrogen gas inlet, and a stirrer, 100 parts by mass of polyester polyol (a polyester polyol obtained by reacting 1,4-cyclohexanedimethanol and neopentyl glycol with adipic acid, the content of the aliphatic cyclic structure in the polyester polyol was 1425 mmol/kg, the hydroxyl group equivalent was 1000 g/equivalent), 17.6 parts by mass of 2,2-dimethylolpropionic acid, 21.7 parts by mass of 1,4-cyclohexanedimethanol, and 106.2 parts by mass of dicyclohexylmethane diisocyanate were reacted in a mixed solvent of 59 parts by mass of methyl ethyl ketone and 119 parts by mass of N-methyl-2-pyrrolidone. Thus, an organic solvent solution of a urethane prepolymer having an isocyanate group at the molecule end was obtained.

Subsequently, 10 parts by mass of γ-aminopropyltriethoxysilane was mixed with the organic solvent solution of the urethane prepolymer, and the urethane prepolymer was reacted with γ-aminopropyltriethoxysilane. Thus, an organic solvent solution of a urethane resin having an aliphatic cyclic structure, a carboxyl group, and a hydrolyzable silyl group or a silanol group was obtained.

Subsequently, 13 parts by mass of triethylamine was added to the organic solvent of the urethane resin to partially or completely neutralize the carboxyl groups carried by the urethane resin, and 378 parts by mass of water was further added and the mixture was stirred sufficiently. Thus, an aqueous dispersion of the urethane resin was obtained.

Subsequently, 8 parts by mass of a 25 mass % aqueous solution of ethylenediamine was added to the aqueous dispersion and stirred to perform chain extension of the polyurethane resin in the particle form. The polyurethane resin was subjected to aging and solvent removal, and thus an aqueous dispersion of the urethane resin (a1)-2 having a solid content of 30 mass % was obtained. Here, the obtained urethane resin (a1)-2 had an acid value of 30, a content of the aliphatic cyclic structure calculated from the ratio of fed raw materials of 4340 mmol/kg, and a weight average molecular weight of 88,000.

Reference Example 3

Production of Urethane Resin (a1)-3

In a nitrogen-purged vessel equipped with a thermometer, a nitrogen gas inlet, and a stirrer, 100 parts by mass of polyester polyol (a polyester polyol obtained by reacting neopentyl glycol and 1,6-hexanediol with adipic acid, the hydroxyl group equivalent was 1000 g/equivalent), 17.6 parts by mass of 2,2-dimethylolpropionic acid, 21.7 parts by mass of 1,4-cyclohexanedimethanol, and 106.2 parts by mass of dicyclohexylmethane diisocyanate were reacted in a mixed solvent of 59 parts by mass of methyl ethyl ketone and 119 parts by mass of N-methyl-2-pyrrolidone. Thus, an organic solvent solution of a urethane prepolymer having an isocyanate group at the molecule end was obtained.

Subsequently, 13 parts by mass of triethylamine was added to the organic solvent solution of the urethane resin to partially or completely neutralize the carboxyl groups carried by the urethane resin. 375 parts by mass of water was further added and the mixture was stirred sufficiently. Thus, an aqueous dispersion of a urethane resin having an aliphatic cyclic structure and a carboxyl group was obtained.

Subsequently, 8 parts by mass of a 25 mass % aqueous solution of ethylenediamine was added to the aqueous dispersion and stirred to perform chain extension of the polyurethane resin in the particle form. The polyurethane resin was subjected to aging and solvent removal, and thus an aqueous dispersion of the urethane resin (a1)-3 having a solid content of 30 mass % was obtained. Here, the obtained urethane resin (a1)-3 had an acid value of 30, a content of the aliphatic cyclic structure calculated from the ratio of fed raw materials of 3877 mmol/kg, and a weight average molecular weight of 47,000.

Reference Example 4

Production of Urethane Resin (a1)-4

In a nitrogen-purged vessel equipped with a thermometer, a nitrogen gas inlet, and a stirrer, 100 parts by mass of polyester polyol (a polyester polyol obtained by reacting neopentyl glycol and 1,6-hexanediol with adipic acid, the hydroxyl group equivalent was 1000 g/equivalent), 12.6 parts by mass of 2,2-dimethylolpropionic acid, 5.5 parts by mass of 1,4-cyclohexanedimethanol, and 58.2 parts by mass of dicyclohexylmethane diisocyanate were reacted in a mixed solvent of 41 parts by mass of methyl ethyl ketone and 83 parts by mass of N-methyl-2-pyrrolidone. Thus, an organic solvent solution of a urethane prepolymer having an isocyanate group at the molecule end was obtained.

Subsequently, 9.5 parts by mass of triethylamine was added to the organic solvent solution of the urethane resin to partially or completely neutralize the carboxyl groups carried by the urethane resin. 275 parts by mass of water was further added and the mixture was stirred sufficiently. Thus, an aqueous dispersion of a urethane resin having an aliphatic cyclic structure and a carboxyl group was obtained.

Subsequently, 4.8 parts by mass of a 25 mass % aqueous solution of ethylenediamine was added to the aqueous dispersion and stirred to perform chain extension of the polyurethane resin in the particle form. The polyurethane resin was subjected to aging and solvent removal, and thus an aqueous dispersion of the urethane resin (a1)-4 having a solid content of 30 mass % was obtained. Here, the obtained urethane resin (a1)-4 had an acid value of 30, a content of the aliphatic cyclic structure calculated from the ratio of fed raw materials of 2714 mmol/kg, and a weight average molecular weight of 51,000.

Reference Example 5

Production of Urethane Resin for Comparison (a1)'-5

In a nitrogen-purged vessel equipped with a thermometer, a nitrogen gas inlet, and a stirrer, 100 parts by mass of polyether polyol ("PTMG2000" manufactured by Mitsubishi Chemical Corp., the hydroxyl group equivalent was 1000 g/equivalent), 13 parts by mass of 2,2-dimethylolpropionic acid, 4.2 parts by mass of neopentyl glycol, and 61.3 parts by mass of isophorone diisocyanate were reacted in a mixed solvent of 59 parts by mass of methyl ethyl ketone and 59 parts by mass of methylpyrrolidone. Thus, an organic solvent solution of a urethane prepolymer having an isocyanate group at the molecule end was obtained.

Subsequently, 10 parts by mass of 3-aminopropyltriethoxysilane was mixed with the organic solvent solution of the urethane prepolymer, and the urethane prepolymer was reacted with 3-aminopropyltriethoxysilane. Thus, an organic solvent solution of a urethane resin having an aliphatic cyclic structure, a carboxyl group, and a hydrolyzable silyl group or a silanol group was obtained.

Subsequently, 13 parts by mass of triethylamine was added to the organic solvent solution of the urethane resin to partially or completely neutralize the carboxyl groups carried by the urethane resin. 370 parts by mass of water was further added and the mixture was stirred sufficiently. Thus, an aqueous dispersion of a urethane resin having an aliphatic cyclic structure and a carboxyl group was obtained.

Subsequently, 12 parts by mass of a 25 mass % aqueous solution of ethylenediamine was added to the aqueous dispersion and stirred to perform chain extension of the polyurethane resin in the particle form. The polyurethane resin was subjected to aging and solvent removal, and thus an aqueous dispersion of the urethane resin (a1)'-5 having a solid content of 30 mass % was obtained. Here, the obtained urethane resin (a1)'-5 had an acid value of 30, a content of the aliphatic cyclic structure calculated from the ratio of fed raw materials of 1449 mmol/kg, and a weight average molecular weight of 97,000.

Reference Example 6

Production of Urethane Resin for Comparison (a1)'-6

In a nitrogen-purged vessel equipped with a thermometer, a nitrogen gas inlet, and a stirrer, 100 parts by mass of polyester polyol (a polyester polyol obtained by reacting 1,4-cyclohexanedimethanol and neopentyl glycol with adipic acid, the content of the aliphatic cyclic structure in the polyester polyol was 1425 mmol/kg, the hydroxyl group equivalent was 1000 g/equivalent), 49.7 parts by mass of 2,2-dimethylolpropionic acid, 127.1 parts by mass of 1,4-cyclohexanedimethanol, and 416.8 parts by mass of dicyclohexylmethane diisocyanate were reacted in a mixed solvent of 59 parts by mass of methyl ethyl ketone and 433 parts by mass of N-methyl-2-pyrrolidone. Thus, an organic solvent solution of a urethane prepolymer having an isocyanate group at the molecule end was obtained.

Subsequently, 37.5 parts by mass of triethylamine was added to the organic solvent solution of the urethane resin to partially or completely neutralize the carboxyl groups carried by the urethane resin. 1083 parts by mass of water was further added and the mixture was stirred sufficiently. Thus, an aqueous dispersion of a urethane resin having an aliphatic cyclic structure and a carboxyl group was obtained, but the aqueous dispersion contained aggregates.

Subsequently, 34.4 parts by mass of a 25 mass % aqueous solution of ethylenediamine was added to the aqueous dispersion and stirred to perform chain extension of the polyurethane resin in the particle form. The polyurethane resin was subjected to aging and solvent removal, and thus an aqueous dispersion of the urethane resin (a1)'-6 having a solid content of 30 mass % was obtained. Here, the obtained urethane resin (a1)'-6 had an acid value of 30, a content of the aliphatic cyclic structure calculated from the ratio of fed raw materials of 5984 mmol/kg, and a weight average molecular weight of 67,000.

Reference Example 7

Production of Acrylic Polymer (For Comparison) (a1)'-7 for Shell Layer Formation In a reaction vessel equipped with a stirrer, a reflux cooling tube, a nitrogen inlet, a thermometer, a dropping funnel for monomer mixture addition, and a dropping funnel for polymerization catalyst addition, 200 parts by mass of deionized water, and 1.5 parts by mass of Aqualon KH-10 (manufactured by Daiichi Kogyo Seiyaku Co., Ltd.; polyoxyethylene-1-(allyloxymethyl)alkyl sulfuric acid ester ammonium salt, solid content 100 mass %) were introduced, and the mixture was heated to 80° C. while blowing nitrogen.

0.5 parts by mass of ammonium persulfate was added under stirring, and subsequently a monomer mixture of 45 parts by mass of methyl methacrylate, 40 parts by mass of n-butyl acrylate, and 15 parts by mass of methacrylic acid was added dropwise over 60 minutes to polymerize therein. In the meantime, the temperature inside the reaction vessel was kept at 80±2° C. After completion of the addition of the monomer mixture, the mixture was maintained at the same temperature for 60 minutes.

Thereafter, the content was cooled to 30° C., and under stirring, 15 parts of 5 mass % ammonia water was added dropwise over 10 minutes at the same temperature. Thereafter, the mixture was adjusted with deionized water to obtain a solid concentration of 30.0 mass %, and the mixture was filtered through a 100-mesh wire screen to obtain an arylic polymer for comparison (a1)'-6.

Example 1

Production of Coating Agent (I)

In a reaction vessel equipped with a stirrer, a reflux cooling tube, a nitrogen inlet, a thermometer, a dropping funnel for monomer mixture addition, and a dropping funnel for polymerization catalyst addition, 140 parts by mass of deionized water, and 100 parts by mass of the aqueous dispersion of urethane resin (a1)-1 obtained in Reference example 1 were introduced, and the mixture was heated to 80° C. while blowing nitrogen.

In the reaction vessel heated to 80° C., to obtain a vinyl polymer constituting the core layer, a monomer mixture of 58 parts by mass of methyl methacrylate, 40 parts by mass of n-butyl acrylate and 2 parts by mass of dimethylaminoethyl methacrylate, and 20 parts by mass of an aqueous solution of ammonium persulfate (concentration: 0.5 mass %) were added dropwise under stirring, from different dropping funnels over 120 minutes while the temperature inside the reaction vessel at 80±2° C. to polymerize.

After completion of the addition, the mixture was stirred for 60 minutes at the same temperature to obtain an aqueous dispersion of core-shell type resin particles.

Thereafter, the aqueous dispersion of the core-shell type resin particles was cooled to 30° C., and under stirring, 4 parts by mass of Z-6040 (γ-glycidoxypropyltrimethoxysilane manufactured by Toray-Dow Corning Co., Ltd.) was added thereto. The mixture was adjusted with deionized water to obtain a solid concentration of 35.0 mass %, and the mixture was filtered through a 100-mesh wire screen to obtain a coating agent (I) of the present invention.

Furthermore, the light transmittance of a mixture of tetrahydrofuran and the aqueous dispersion of the core-shell type resin particles used in the production of the coating agent (I) having the content of non-volatile components adjusted to 30 mass %, was measured according to the method described above, and the value was 93.4%.

Examples 2 to 5

Coating agents (II) to (V) were prepared by the same method as in Example 1, except that the composition and mixing ratios were changed as indicated in Table 1 and Table 2.

Example 6

In a nitrogen-purged vessel equipped with a thermometer, a nitrogen gas inlet, and a stirrer, 100 parts by mass of polyester polyol ("a polyester polyol obtained by reacting 1,4-cyclohexanedimethanol and neopentyl glycol with adipic acid", the content of the aliphatic cyclic structure in the polyester polyol was 1425 mmol/kg, the hydroxyl group equivalent was 1000 g/equivalent), 17.6 parts by mass of 2,2-dimethylolpropionic acid, 21.7 parts by mass of 1,4-cyclohexanedimethanol, and 106.2 parts by mass of dicyclohexylmethane diisocyanate were reacted in a monomer mixture of 142.4 parts by mass of methyl methacrylate and 98.2 parts by mass of butyl acrylate. Thus, a monomer mixed solution of a urethane prepolymer having an isocyanate group at the molecule end was obtained.

Subsequently, 10 parts by mass of γ-aminopropyltriethoxysilane was mixed with the organic solvent solution of the urethane prepolymer, and the urethane prepolymer was reacted with γ-aminopropyltriethoxysilane. Thus, an organic solvent solution of a urethane resin having an aliphatic cyclic structure, a carboxyl group, and a hydrolyzable silyl group or a silanol group was obtained.

Subsequently, 13 parts by mass of triethylamine was added to the organic solvent solution of the urethane resin to partially or completely neutralize the carboxyl groups carried by the urethane resin. 620 parts by mass of water was further added and the mixture was stirred sufficiently. Thus, an aqueous dispersion of a urethane resin having an aliphatic cyclic structure and a carboxyl group was obtained.

Subsequently, 8 parts by mass of a 25 mass % aqueous solution of ethylenediamine was added to the aqueous dispersion and stirred to perform chain extension of the polyurethane resin in the particle form. The polyurethane resin was subjected to aging and solvent removal, and thus an aqueous dispersion of the urethane resin (a1)-7 having a solid content of 30 mass % was obtained. Here, the obtained urethane resin (a1)-7 had an acid value of 30, a content of the aliphatic cyclic structure calculated from the ratio of fed raw materials of 4301 mmol/kg, and a weight average molecular weight of 73,000.

Subsequently, 4.9 parts by mass of dimethylaminoethyl methacrylate was added to the aqueous dispersion of the urethane resin (a1)-7, and the mixture was stirred and mixed. The mixture was heated to 70° C. while blowing nitrogen to the reaction vessel.

In the reaction vessel heated to 70° C., 12.5 parts by mass of an aqueous solution of ammonium persulfate (concentration: 2 mass %) was added under stirring, and polymerization of the monomer mixture was initiated. After the addition of the aqueous solution of ammonium persulfate, there was heat generation due to the polymerization, and the temperature inside the reaction vessel increased to 85° C. After the heat generation was settled, while the temperature inside the reaction vessel was maintained at 80±2° C., polymerization of the monomer mixture was completed over 120 minutes. Thus, an aqueous dispersion of core-shell type resin particles was obtained.

Thereafter, the aqueous dispersion of the core-shell type resin particles was cooled to 30° C., and under stirring, 2 parts by mass of Z-6040 (γ-glycidoxypropyltrimethoxysilane manufactured by Toray-Dow Corning Co., Ltd.) was added thereto. The mixture was adjusted with deionized water to obtain a solid concentration of 35.0 mass %, and the mixture was filtered through a 100-mesh wire screen to obtain a coating agent (VI) of the present invention.

Furthermore, the light transmittance of a mixture of tetrahydrofuran and the aqueous dispersion of the core-shell type resin particles used in the production of the coating agent (VI) having the content of non-volatile components adjusted to 30 mass %, was measured according to the method described above, and the value was 92.3%.

Comparative Example 1

In a reaction vessel equipped with a stirrer, a reflux cooling tube, a nitrogen inlet, a thermometer, a dropping funnel for monomer mixture addition, and a dropping funnel for polymerization catalyst addition, 140 parts by mass of deionized water, and 100 parts by mass of the aqueous dispersion of urethane resin for comparison (a1)'-7 obtained in Reference example 6 were introduced, and the mixture was heated to 80° C. while blowing nitrogen.

In the reaction vessel heated to 80° C., a monomer mixture of 58 parts by mass of methyl methacrylate, 40 parts by mass of n-butyl acrylate and 2 parts by mass of dimethylaminoethyl methacrylate, and 20 parts by mass of an aqueous solution of ammonium persulfate (concentration: 0.5 mass %) were added dropwise under stirring, from different dropping funnels over 120 minutes while the temperature inside the reaction vessel at 80±2° C. to polymerize.

After completion of the addition, the mixture was stirred and polymerized for 60 minutes at the same temperature to obtain an aqueous dispersion of core-shell type resin particles.

Thereafter, the aqueous dispersion of the core-shell type resin particles was cooled to 30° C., and under stirring, 4 parts by mass of Z-6040 (γ-glycidoxypropyltrimethoxysilane manufactured by Toray-Dow Corning Co., Ltd.) was added thereto. The mixture was adjusted with deionized water to obtain a solid concentration of 35.0 mass %, and the mixture was filtered through a 100-mesh wire screen to obtain a coating agent for comparison (VII).

Furthermore, the light transmittance of a mixture of tetrahydrofuran and the aqueous dispersion of the core-shell type resin particles used in the production of the coating agent (VII) having the content of non-volatile components adjusted to 30 mass %, was measured according to the method described above, and the value was 91.5%.

Comparative Example 2

In a reaction vessel equipped with a stirrer, a reflux cooling tube, a nitrogen inlet, a thermometer, a dropping funnel for monomer mixture addition, and a dropping funnel for polymerization catalyst addition, 140 parts by mass of deionized water, and 100 parts by mass of the aqueous dispersion of urethane resin for comparison (a1)-1 obtained in Reference example 1 were introduced, and the mixture was heated to 80° C. while blowing nitrogen.

In the reaction vessel heated to 80° C., a monomer mixture of 58 parts by mass of methyl methacrylate, 40 parts by mass of n-butyl acrylate and 2 parts by mass of dimethylaminoethyl methacrylate, and 20 parts by mass of an aqueous solution of ammonium persulfate (concentration: 0.5 mass %) were added dropwise under stirring, from different dropping funnels over 120 minutes while the temperature inside the reaction vessel at 80±2° C. to polymerize.

After completion of the addition, the mixture was stirred for 60 minutes at the same temperature to obtain an aqueous dispersion of core-shell type resin particles.

Thereafter, the resin aqueous dispersion was cooled to 30° C., and the aqueous dispersion was adjusted with deionized water to obtain a solid concentration of 35.0 mass %, and the mixture was filtered through a 100-mesh wire screen to obtain a coating agent for comparison (VIII).

Furthermore, the light transmittance of a mixture of tetrahydrofuran and the aqueous dispersion of the core-shell type resin particles used in the production of the coating agent (VIII) having the content of non-volatile components adjusted to 30 mass %, was measured according to the method described above, and the value was 93.9%.

Comparative Example 3

In a reaction vessel equipped with a stirrer, a reflux cooling tube, a nitrogen inlet, a thermometer, a dropping funnel for monomer mixture addition, and a dropping funnel for polymerization catalyst addition, 140 parts by mass of deionized water, and 100 parts by mass of the aqueous dispersion of urethane resin for comparison (a1)-2 obtained in Reference example 2 were introduced, and the mixture was heated to 80° C. while blowing nitrogen.

In the reaction vessel heated to 80° C., a monomer mixture of 58 parts by mass of methyl methacrylate, 40 parts by mass of n-butyl acrylate and 2 parts by mass of dimethylaminoethyl methacrylate, and 20 parts by mass of an aqueous solution of ammonium persulfate (concentration: 0.5 mass %) were added dropwise under stirring, from different dropping funnels over 120 minutes while the temperature inside the reaction vessel at 80±2° C. to polymerize.

After completion of the addition, the mixture was stirred and polymerized for 60 minutes at the same temperature inside the reaction vessel to obtain an aqueous dispersion of core-shell type resin particles.

Thereafter, the resin aqueous dispersion was cooled to 30° C., and under stirring 4 parts by mass of Denacol EX-614B (manufactured by Nagase ChemteX Corp.; sorbitol polyglycidyl ether) as a polyfunctional epoxy compound was added thereto. The mixture was adjusted with deionized water to obtain a solid concentration of 35.0 mass %, and the mixture was filtered through a 100-mesh wire screen to obtain a coating agent for comparison (IX).

Furthermore, the light transmittance of a mixture of tetrahydrofuran and the aqueous dispersion of the core-shell type resin particles used in the production of the coating agent (IX) having the content of non-volatile components adjusted to 30 mass %, was measured according to the method described above, and the value was 90.3%.

Comparative Example 4

In a reaction vessel equipped with a stirrer, a reflux cooling tube, a nitrogen inlet, a thermometer, a dropping funnel for monomer mixture addition, and a dropping funnel for polymerization catalyst addition, 140 parts by mass of deionized water, and 100 parts by mass of the aqueous dispersion of urethane resin for comparison (a1)-1 obtained in Reference example 1 were introduced, and the mixture was heated to 80° C. while blowing nitrogen.

In the reaction vessel heated to 80° C., a monomer mixture of 60 parts by mass of methyl methacrylate and 40 parts by mass of n-butyl acrylate, and 20 parts by mass of an aqueous solution of ammonium persulfate (concentration: 0.5 mass %) were added dropwise under stirring, from different dropping funnels over 120 minutes while the temperature inside the reaction vessel at 80±2° C. to polymerize.

After completion of the addition, the mixture was stirred and polymerized for 60 minutes at the same temperature inside the reaction vessel to obtain an aqueous dispersion of core-shell type resin particles.

Thereafter, the resin aqueous dispersion was cooled to 30° C., and the aqueous dispersion was adjusted with deionized water to obtain a solid concentration of 35.0 mass %, and the mixture was filtered through a 100-mesh wire screen to obtain a coating agent for comparison (X).

Furthermore, the light transmittance of a mixture of tetrahydrofuran and the aqueous dispersion of the core-shell type resin particles used in the production of the coating agent (X) having the content of non-volatile components adjusted to 30 mass %, was measured according to the method described above, and the value was 93.5%.

Comparative Example 5

In a reaction vessel equipped with a stirrer, a reflux cooling tube, a nitrogen inlet, a thermometer, a dropping funnel for monomer mixture addition, and a dropping funnel for polymerization catalyst addition, 140 parts by mass of deionized water, and 100 parts by mass of the aqueous dispersion of urethane resin for comparison (a1)'-5 obtained in Reference example 5 were introduced, and the mixture was heated to 80° C. while blowing nitrogen.

In the reaction vessel heated to 80° C., a monomer mixture of 58 parts by mass of methyl methacrylate, 40 parts by mass of n-butyl acrylate, and 2 parts by mass of dimethylaminoethyl methacrylate, and 20 parts by mass of an aqueous solution of ammonium persulfate (concentration: 0.5 mass %) were added dropwise under stirring, from different dropping funnels over 120 minutes while the temperature inside the reaction vessel at 80±2° C. to polymerize.

After completion of the addition, the mixture was stirred and polymerized for 60 minutes at the same temperature inside the reaction vessel to obtain an aqueous dispersion of core-shell type resin particles.

Thereafter, the resin aqueous dispersion was cooled to 30° C., and under stirring, 4 parts by mass of Z-6040 (γ-glycidoxypropyltrimethoxysilane manufactured by Toray-Dow Corning Co., Ltd.) was added thereto. The mixture was adjusted with deionized water to obtain a solid concentration of 35.0 mass %, and the mixture was filtered through a 100-mesh wire screen to obtain a coating agent for comparison (XI).

Furthermore, the light transmittance of a mixture of tetrahydrofuran and the aqueous dispersion of the core-shell type resin particles used in the production of the coating agent (XI) having the content of non-volatile components adjusted to 30 mass %, was measured according to the method described above, and the value was 94.5%.

Comparative Example 6

In a reaction vessel equipped with a stirrer, a reflux cooling tube, a nitrogen inlet, a thermometer, a dropping funnel for monomer mixture addition, and a dropping funnel for polymerization catalyst addition, 140 parts by mass of deionized water, and 100 parts by mass of the aqueous dispersion of urethane resin for comparison (a1)'-6 obtained in Reference example 6 were introduced, and the mixture was heated to 80° C. while blowing nitrogen.

In the reaction vessel heated to 80° C., a monomer mixture of 58 parts by mass of methyl methacrylate, 40 parts by mass of n-butyl acrylate, and 2 parts by mass of dimethylaminoethyl methacrylate, and 20 parts by mass of an aqueous solution of ammonium persulfate (concentration: 0.5 mass %) were added dropwise under stirring, from different dropping funnels over 120 minutes while the temperature inside the reaction vessel at 80±2° C. to polymerize.

After completion of the addition, the mixture was stirred and polymerized for 60 minutes at the same temperature inside the reaction vessel to obtain an aqueous dispersion of core-shell type resin particles, but the aqueous dispersion contained a large amount of aggregates.

Thereafter, the resin aqueous dispersion was cooled to 30° C., and under stirring, 4 parts by mass of Z-6040 (γ-glycidoxypropyltrimethoxysilane manufactured by Toray-Dow Corning Co., Ltd.) was added thereto. The mixture was adjusted with deionized water to obtain a solid concentration of 35.0 mass %, and the mixture was filtered through a 100-mesh wire screen to obtain a coating agent for comparison (XII).

Furthermore, the light transmittance of a mixture of tetrahydrofuran and the aqueous dispersion of the core-shell type resin particles used in the production of the coating agent (XII) having the content of non-volatile components adjusted to 30 mass %, was measured according to the method described above, and the value was 93.2%.

Comparative Example 7

In a reaction vessel equipped with a stirrer, a reflux cooling tube, a nitrogen inlet, a thermometer, a dropping funnel for monomer mixture addition, and a dropping funnel for polymerization catalyst addition, 140 parts by mass of deionized water, and 100 parts by mass of the aqueous dispersion of urethane resin for comparison (a1)-2 obtained in Reference example 2 were introduced, and the mixture was heated to 80° C. while blowing nitrogen.

In the reaction vessel heated to 80° C., a monomer mixture of 58 parts by mass of methyl methacrylate, 40 parts by mass of n-butyl acrylate, and 2 parts by mass of Z-6030 (γ-methacryloxypropyltrimethoxysilane manufactured by Toray-Dow Corning Co., Ltd.), and 20 parts by mass of an aqueous solution of ammonium persulfate (concentration: 0.5 mass %) were added dropwise under stirring, from different dropping funnels over 120 minutes while the temperature inside the reaction vessel at 80±2° C. to polymerize.

After completion of the addition, the mixture was stirred and polymerized for 60 minutes at the same temperature inside the reaction vessel to obtain an aqueous dispersion of core-shell type resin particles.

Thereafter, the resin aqueous dispersion was cooled to 30° C., and the aqueous dispersion was adjusted with deionized water to obtain a solid concentration of 35.0 mass %, and the mixture was filtered through a 100-mesh wire screen to obtain a coating agent for comparison (XIII).

Furthermore, the light transmittance of a mixture of tetrahydrofuran and the aqueous dispersion of the core-shell type resin particles used in the production of the coating agent (XIII) having the content of non-volatile components adjusted to 30 mass %, was measured according to the method described above, and the value was 35.2%.

Comparative Example 8

30 parts by mass of deionized water was introduced into a vessel for pre-emulsion mixing, and 4 parts by mass of emulsifier Noigen XL-400 (manufactured by Daiichi Kogyo Seiyaku Co., Ltd.; polyoxyethylene decyl ether, solid content 100 mass %) was added. The mixture was stirred and dissolved. To the vessel, monomer components of 40 parts by mass of n-butyl acrylate, 58 parts by mass of methyl methacrylate, and 2 parts by mass of dimethylaminoethyl methacrylate were sequentially added and stirred to prepare a pre-emulsion of the monomer mixture.

In a reaction vessel equipped with a stirrer, a reflux cooling tube, a nitrogen inlet, a thermometer and a dropping funnel, 100 parts by mass of deionized water was introduced, and the content was heated to 80° C. while blowing nitrogen. Under stirring, 0.3 parts of ammonium persulfate was added, and subsequently, the pre-emulsion of the monomer mixture was added dropwise over 120 minutes while the temperature was maintained at 80±2° C. to polymerize. Thus, an acrylic polymer (Y) was prepared.

After completion of the addition, the temperature inside the reaction vessel was maintained at the same temperature, and the content was maintained stirred for 60 minutes. Thereafter, the content was cooled to 30° C., and was mixed with 100 parts by mass of the aqueous dispersion of urethane resin of Reference Example 1 to obtain a resin aqueous dispersion.

Thereafter, 4 parts by mass of Z-6040 (γ-glycidoxypropyltrimethoxysilane manufactured by Toray-Dow Corning Co., Ltd.) was added to the resin aqueous dispersion, and the mixture stirred and mixed. Then, the mixture was adjusted with deionized water to obtain a solid concentration of 35.0 mass %, and the mixture was filtered through a 100-mesh wire screen to obtain a coating agent for comparison (XIV).

Furthermore, the light transmittance of a mixture of tetrahydrofuran and the aqueous dispersion of the core-shell type resin particles used in the production of the coating agent (XIV) having the content of non-volatile components adjusted to 30 mass %, was measured according to the method described above, and the value was 56.8%.

The evaluation results of the Examples and Comparative Examples are presented in the following Tables 1 to 4.

TABLE 1

|  |  | Example 1 | Example 2 | Example 3 |
|---|---|---|---|---|
| Shell layer | | | | |
| Urethane resin (a1) used | | (a1)-1 | (a1)-2 | (a1)-3 |
| Content of aliphatic cyclic structure (mmol/kg) | | 4452 | 4340 | 3877 |
| Presence of hydrolyzable silyl group or silanol group | | absent | present | absent |
| Amount of use of urethane resin (a1) (parts by mass) | | 30 | 30 | 50 |
| Core layer | | | | |
| Vinyl monomer used in production of vinyl polymer (a2) | MMA (parts by mass) | 58 | 58 | 50 |
| | BA (parts by mass) | 40 | 40 | 49 |
| | DMAEMA (parts by mass) | 2 | 2 | 1 |
| Amount of basic nitrogen atom-containing group in vinyl polymer (mmol/kg) | | 127 | 127 | 64 |
| Mass ratio of [shell layer/core layer] | | 23/77 | 23/77 | 33/67 |
| Light transmittance of THF mixture liquid of resin particles (%) | | 93.4 | 90.5 | 91.1 |
| Compound (B) used | | Z-6040 | Z-6040 | Z-6043 |
| Amount of use of above compound (B) (parts by mass) | | 4 | 4 | 6 |
| Solvent resistance Dried at 25° C., 7 days | Ethanol | B | A | C |
| | Methyl ethyl ketone | B | A | B |
| Solvent resistance Dried at 140° C., 20 min | Ethanol | B | A | B |
| | Methyl ethyl ketone | B | A | B |
| Chemical resistance (acid resistance) | 1 N hydrochloric acid | A | A | A |
| Chemical resistance (alkali resistance) | 5% sodium hydroxide | A | A | B |
| Water resistance (hot water resistance) | Hot water at 50° C. | A | A | B |
| Adhesiveness to plastic base material (primary adhesiveness) | Base material made of ABS resin | A | A | A |
| | Base material made of ABS/PC resin | A | A | A |
| | Base material made of PC resin | A | A | A |
| | Base material made of PMMA resin | A | A | A |
| | Base material made of PS resin | B | B | B |
| Adhesiveness to plastic base material (hot water adhesiveness) | Base material made of ABS resin | A | A | A |
| | Base material made of ABS/PC resin | A | A | A |
| | Base material made of PC resin | A | A | A |
| | Base material made of PMMA resin | A | A | A |

TABLE 1-continued

|  |  | Example 1 | Example 2 | Example 3 |
|---|---|---|---|---|
|  | Base material made of PS resin | B | B | B |
| Corrosion resistance | Plane part | A | A | A |
|  | Peripheral part of crosscut part | A | A | B |

TABLE 2

|  |  | Example 4 | Example 5 | Example 6 |
|---|---|---|---|---|
| Shell layer | | | | |
| Urethane resin (a1) used | | (a1)-2 | (a1)-4 | (a1)-7 |
| Content of aliphatic cyclic structure (mmol/kg) | | 4340 | 2714 | 4301 |
| Presence of hydrolyzable silyl group or silanol group | | present | absent | present |
| Amount of use of urethane resin (a1) (parts by mass) | | 30 | 30 | 245.5 |
| Core layer | | | | |
| Vinyl monomer used in production of vinyl polymer (a2) | MMA (parts by mass) | 58 | 58 | 142.4 |
|  | BA (parts by mass) | 40 | 40 | 98.2 |
|  | DMAEMA (parts by mass) | 1 | 2 | 4.9 |
| Amount of basic nitrogen atom-containing group in vinyl polymer (mmol/kg) | | 64 | 127 | 127 |
| Mass ratio of [shell layer/core layer] | | 23/77 | 23/77 | 50/50 |
| Light transmittance of THF mixture liquid of resin particles (%) | | 90.2 | 91.5 | 92.3 |
| Compound (B) used | | Z-6043 | Z-6040 | Z-6040 |
| Amount of use of above compound (B) (parts by mass) | | 2 | 4 | 2 |
| Solvent resistance Dried at 25° C., 7 days | Ethanol | A | B | A |
|  | Methyl ethyl ketone | B | B | A |
| Solvent resistance Dried at 140° C., 20 min | Ethanol | A | B | A |
|  | Methyl ethyl ketone | B | B | A |
| Chemical resistance (acid resistance) | 1 N hydrochloric acid | A | B | A |
| Chemical resistance (alkali resistance) | 5% sodium hydroxide | A | B | A |
| Water resistance (hot water resistance) | Hot water at 50° C. | A | B | A |
| Adhesiveness to plastic base material (primary adhesiveness) | Base material made of ABS resin | A | A | A |
|  | Base material made of ABS/PC resin | A | A | A |
|  | Base material made of PC resin | A | A | A |
|  | Base material made of PMMA resin | A | A | A |
|  | Base material made of PS resin | A | B | A |
| Adhesiveness to plastic base material (hot water adhesiveness) | Base material made of ABS resin | A | A | A |
|  | Base material made of ABS/PC resin | A | A | A |
|  | Base material made of PC resin | A | A | A |
|  | Base material made of PMMA resin | A | A | A |
|  | Base material made of PS resin | A | B | A |
| Corrosion resistance | Plane part | A | B | A |
|  | Peripheral part of crosscut part | A | B | A |

TABLE 3

|  | Comp. Ex. 1 | Comp. Ex. 2 | Comp. Ex. 3 | Comp. Ex. 4 |
|---|---|---|---|---|
| Shell layer | | | | |
| Urethane resin (a1) used | — | (a1)-1 | (a1)-2 | (a1)-1 |
| Content of aliphatic cyclic structure (mmol/kg) | — | 4452 | 4340 | 4452 |

TABLE 3-continued

|  |  | Comp. Ex. 1 | Comp. Ex. 2 | Comp. Ex. 3 | Comp. Ex. 4 |
|---|---|---|---|---|---|
| Presence of hydrolyzable silyl group or silanol group |  | — | absent | present | absent |
| Amount of use of urethane resin (a1) (parts by mass) |  | — | 30 | 30 | 30 |
| Other shell layer | | | | | |
| Acrylic polymer (a1)'-7 |  | 30 | — | — | — |
| Core layer | | | | | |
| Vinyl monomer used in production of vinyl polymer (a2) | MMA (parts by mass) | 58 | 58 | 58 | 60 |
|  | BA (parts by mass) | 40 | 40 | 40 | 40 |
|  | DMAEMA (parts by mass) | 2 | 2 | 2 | — |
| Amount of basic nitrogen atom-containing group in vinyl polymer (mmol/kg) |  | 127 | 127 | 127 | — |
| Mass ratio of [shell layer/core layer] |  | 23/77 | 23/77 | 23/77 | 23/77 |
| Light transmittance of THF mixture liquid of resin particles (%) |  | 91.5 | 93.9 | 90.3 | 93.5 |
| Compound (B) used |  | Z-6040 | — | EX-614B | Z-6040 |
| Amount of use of above compound (B) (parts by mass) |  | 4 | — | 4 | 4 |
| Solvent resistance Dried at 25° C., 7 days | Ethanol | C | D | C | D |
|  | Methyl ethyl ketone | D | D | D | D |
| Solvent resistance Dried at 140° C., 20 min | Ethanol | B | D | C | D |
|  | Methyl ethyl ketone | C | D | D | D |
| Chemical resistance (acid resistance) | 1 N hydrochloric acid | C | B | C | C |
| Chemical resistance (alkali resistance) | 5% sodium hydroxide | D | B | B | D |
| Water resistance (hot water resistance) | Hot water at 50° C. | D | C | C | D |
| Adhesiveness to plastic base material (primary adhesiveness) | Base material made of ABS resin | C | A | A | A |
|  | Base material made of ABS/PC resin | D | A | A | A |
|  | Base material made of PC resin | D | A | A | A |
|  | Base material made of PMMA resin | A | A | B | B |
|  | Base material made of PS resin | D | D | D | C |
| Adhesiveness to plastic base material (hot water adhesiveness) | Base material made of ABS resin | D | C | D | D |
|  | Base material made of ABS/PC resin | D | C | D | D |
|  | Base material made of PC resin | D | D | D | D |
|  | Base material made of PMMA resin | C | C | D | D |
|  | Base material made of PS resin | D | D | D | D |
| Corrosion resistance | Plane part | D | B | B | C |
|  | Peripheral part of crosscut part | C | B | B | D |

TABLE 4

|  | Comp. Ex. 5 | Comp. Ex. 6 | Comp. Ex. 7 | Comp. Ex. 8 |
|---|---|---|---|---|
| Shell layer | | | | |
| Urethane resin (a1) used | (a1)'-5 | (a1)'-6 | (a1)-2 | Mixture of urethane resin (a1)-1 and acrylic polymer (Y) |
| Content of aliphatic cyclic structure (mmol/kg) | 1449 | 5984 | 4340 |  |
| Presence of hydrolyzable silyl group or silanol group | present | absent | present |  |
| Amount of use of urethane resin (a1) (parts by mass) | 30 | 30 | 30 | — |

TABLE 4-continued

|  |  | Comp. Ex. 5 | Comp. Ex. 6 | Comp. Ex. 7 | Comp. Ex. 8 |
|---|---|---|---|---|---|
| Other shell layer | | | | | |
| Acrylic polymer (a1)'-7 | | — | — | — | |
| Core layer | | | | | |
| Vinyl monomer used in production of vinyl polymer (a2) | MMA (parts by mass) | 58 | 58 | 58 | |
| | BA (parts by mass) | 40 | 40 | 40 | |
| | DMAEMA (parts by mass) | 2 | 2 | — | |
| | Z-6030 (parts by mass) | — | — | 2 | |
| Amount of basic nitrogen atom-containing group in vinyl polymer (mmol/kg) | | 127 | 127 | — | |
| Mass ratio of [shell layer/core layer] | | 23/77 | 23/77 | 23/77 | |
| Light transmittance of THF mixture liquid of resin particles (%) | | 94.5 | 93.2 | 35.2 | 56.8 |
| Compound (B) used | | Z-6040 | Z-6040 | — | Z-6040 |
| Amount of use of above compound (B) (parts by mass) | | 4 | 4 | — | 4 |
| Solvent resistance Dried at 25° C., 7 days | Ethanol | B | D | D | D |
| | Methyl ethyl ketone | B | D | D | D |
| Solvent resistance Dried at 140° C., 20 min | Ethanol | A | D | D | D |
| | Methyl ethyl ketone | B | C | D | D |
| Chemical resistance (acid resistance) | 1 N hydrochloric acid | C | D | C | D |
| Chemical resistance (alkali resistance) | 5% sodium hydroxide | D | D | B | D |
| Water resistance (hot water resistance) | Hot water at 50° C. | D | D | D | D |
| Adhesiveness to plastic base material (primary adhesiveness) | Base material made of ABS resin | A | D | D | B |
| | Base material made of ABS/PC resin | A | D | D | C |
| | Base material made of PC resin | A | D | D | C |
| | Base material made of PMMA resin | D | D | D | D |
| | Base material made of PS resin | D | D | D | D |
| Adhesiveness to plastic base material (hot water adhesiveness) | Base material made of ABS resin | D | D | D | D |
| | Base material made of ABS/PC resin | D | D | D | D |
| | Base material made of PC resin | D | D | D | D |
| | Base material made of PMMA resin | D | D | D | D |
| | Base material made of PS resin | D | D | D | D |
| Corrosion resistance | Plane part | D | D | C | C |
| | Peripheral part of crosscut part | D | D | D | C |

The abbreviations in the Tables 1 to 4 are explained below.

MMA: Methyl methacrylate

BA: n-butyl acrylate

DMAEMA: Dimethylaminoethyl methacrylate

Z-6030: γ-Methacryloxypropyltrimethoxysilane manufactured by Toray-Dow Corning Co., Ltd.)

Z-6040: γ-Glycidoxypropyltrimethoxysilane manufactured by Toray-Dow Corning Co., Ltd.)

Z-6043: 2-(3',4'-Epoxycyclohexyl)ethyltrimethoxysilane manufactured by Toray-Dow Corning Co., Ltd.)

EX-614B: Sorbitol polyglycidyl ether manufactured by Nagase ChemteX Co., Ltd.

Base material made of ABS resin: Base material made of acrylonitrile-butadiene-styrene resin Base material made of PC resin: Base material made of polycarbonate resin Base material made of ABS/PC resin: Base material made of a polymer alloy of acrylonitrile-butadiene-styrene resin and polycarbonate resin Base material made of PMMA resin: Base material made of polymethyl methacrylate resin Base material made of PS resin: Base material made of polystyrene resin

The invention claimed is:

1. A coating agent comprising:
core-shell type resin particles (A) comprising
a shell layer comprising a urethane resin (a1), which comprises an aliphatic cyclic structure with 2000 to 5500 mmol/kg relative to the total amount of the urethane resin (a1) and at least one functional group selected from the group consisting of a carboxyl group and a carboxylate group, and
a core layer comprising a vinyl polymer (a2) which is a (meth)acrylic acid ester copolymer having 50 to 150 mmol/kg of a tertiary amino group relative to the total amount of the core-shell type resin particles (A);
a compound (B) comprising an epoxy group and an alkoxysilyl group; and
a water-based medium,
wherein the core-shell type resin particles (A) is obtained by reacting polyols including a carboxyl group-containing polyol (a1-1) and an aliphatic cyclic structure-containing polyol (a1-2) with polyisocyanate containing an aliphatic cyclic structure-containing polyisocyanate (a-3) to yield an aqueous dispersion of the urethane resin (a1); and then in the aqueous dispersion, polymerizing a vinyl monomer containing a vinyl monomer having a basic nitrogen atom-containing group to yield the vinyl polymer (a2), and the vinyl polymer (a2) is obtained by polymerizing vinyl monomers including a (meth)acrylic acid ester monomer containing a tertiary amino group, and the amount of the (meth)acrylic acid ester monomer containing a tertiary amino group is in the range of 0.1 to 10 mass % relative to the total amount of the vinyl monomer used in the production of the vinyl polymer (a2).

2. The coating agent according to claim 1, wherein the mass ratio of the urethane resin (a1) and the vinyl polymer (a2)[(a1)/(a2)] is 10/90 to 70/30.

3. The coating agent according to claim 1, wherein the urethane resin (a1) further comprises at least one functional group selected from the group consisting of a hydrolyzable silyl group and a silanol group.

4. The coating agent according to claim 1, wherein the urethane resin (a1) is produced by obtaining a urethane resin (a1') by reacting polyols including the carboxyl group-containing polyol (a1-1) and the aliphatic cyclic structure-containing polyol (a1-2), with an aliphatic cyclic structure-containing polyisocyanate (a1-3), and neutralizing part or all of the carboxyl groups carried by the urethane resin (a1') with a basic compound.

5. The coating agent according to claim 1, wherein the compound (B) is at least one selected from the group consisting of γ-glycidoxypropyltrimethoxysilane, γ-glycidoxypropyltriethoxysilane and 2-(3,4-epoxycyclohexyl)ethyltrimethoxysilane.

6. A coating agent for plastic base materials, comprising the coating agent of any one of claims 1 to 3, 4 and 5.

7. A coating agent for metallic base materials, comprising the coating agent of any one of claims 1 to 3, 4 and 5.

8. A method for producing a coating agent, the method comprising:

reacting polyols including a carboxyl group-containing polyol (a1-1) and an aliphatic cyclic structure-containing polyol (a1-2), with an polyisocyanate containing an aliphatic cyclic structure-containing polyisocyanate (a1-3) in the presence of a vinyl monomer that does not contain a basic nitrogen atom-containing group, to obtain a urethane resin (a1');

neutralizing part or all of the carboxyl groups carried by the urethane resin (a1'), using a basic compound;

dispersing the neutralization product in a water-based medium to obtain an aqueous dispersion of a urethane resin (a1) so that the urethane resin (a1) comprises an aliphatic cyclic structure with 2000 to 5500 mmol/kg relative to the total amount of the urethane resin (a1);

adding a (meth)acrylic acid ester monomer having a tertiary amino group, and polymerizing the vinyl monomer that does not contain a basic nitrogen atom-containing group and the (meth)acrylic acid ester monomer having the tertiary amino group to obtain a vinyl polymer (a2), in the presence of the urethane resin (a1) particles, to produce core-shell type resin particles (A), wherein the amount of the (meth)acrylic acid ester monomer containing a tertiary amino group is in the range of 0.1 to 10 mass % relative to the total amount of the vinyl monomer used in the production of the vinyl polymer (a2); and mixing the aqueous dispersion of the core-shell type resin particles (A) and a compound (B) having an epoxy group and an alkoxysilyl group.

9. The coating agent according to claim 1, wherein the (meth)acrylic acid ester monomer containing a tertiary amino group is at least one monomer selected from the group consisting of N,N-dimethylaminoethyl (meth)acrylate, N,N-dimethylaminopropyl (meth)acrylate, N,N-diethylaminoethyl (meth)acrylate, N,N-dimethylaminopropyl (meth)acrylate and N,N-diethylaminopropyl (meth)acrylate.

10. The coating agent according to claim 9, wherein the vinyl polymer (a2) is obtained by polymerizing vinyl monomers further including a (meth)acrylic acid ester monomer that does not contain a basic nitrogen atom-containing group.

11. The coating agent according to claim 10, wherein the (meth)acrylic acid ester monomer that does not contain a basic nitrogen atom-containing group is a monomer selected from the group consisting of methyl (meth)acrylate, ethyl (meth)acrylate, n-butyl (meth)acrylate, i-butyl (meth)acrylate, t-butyl (meth)acrylate, 2-ethylhexyl (meth)acrylate, hexyl (meth)acrylate, cyclohexyl (meth)acrylate and isobornyl (meth)acrylate.

12. The coating agent according to claim 10, wherein the amount of the (meth)acrylic acid ester monomer that does not contain a basic nitrogen atom-containing group in the range of 70 to 100 mass % with respect to the total amount of the vinyl monomer used in the production of the vinyl polymer (a2).

13. The method for producing a coating agent according to claim 8, wherein the (meth)acrylic acid ester monomer having the tertiary amino group is at least one monomer selected from the group consisting of N,N-dimethylaminoethyl (meth)acrylate, N,N-dimethylaminopropyl (meth)acrylate, N,N-diethylaminoethyl (meth)acrylate, N,N-dimethylaminopropyl (meth)acrylate and N,N-diethylaminopropyl (meth)acrylate.

14. The method for producing a coating agent according to claim 13, wherein the vinyl monomer that does not contain a basic nitrogen atom-containing group comprises a (meth)acrylic acid ester monomer that does not contain a basic nitrogen atom-containing group.

15. The method for producing a coating agent according to claim 14, wherein the (meth)acrylic acid ester monomer that does not contain a basic nitrogen atom-containing group is a monomer selected from the group consisting of methyl (meth)acrylate, ethyl (meth)acrylate, n-butyl (meth)acrylate, i-butyl (meth)acrylate, t-butyl (meth)acrylate, 2-ethylhexyl (meth)acrylate, hexyl (meth)acrylate, cyclohexyl (meth)acrylate and isobornyl (meth)acrylate.

16. The method for producing a coating agent according to claim 14, wherein the amount of the (meth)acrylic acid ester monomer that does not contain a basic nitrogen atom-containing group in the range of 70 to 100 mass % with respect to the total amount of the vinyl monomer used in the production of the vinyl polymer (a2).

* * * * *